(12) United States Patent
Blonk et al.

(10) Patent No.: US 8,503,800 B2
(45) Date of Patent: Aug. 6, 2013

(54) ILLUMINATION DETECTION USING CLASSIFIER CHAINS

(75) Inventors: Leendert Blonk, Galway (IE); Mihnea Gangea, Bucharest (RO); Peter Corcoran, Galway (IE)

(73) Assignee: DigitalOptics Corporation Europe Limited, Galway (IE)

( * ) Notice: Subject to any disclaimer, the term of this patent is extended or adjusted under 35 U.S.C. 154(b) by 1446 days.

(21) Appl. No.: 12/038,777

(22) Filed: Feb. 27, 2008

(65) Prior Publication Data

US 2008/0219517 A1   Sep. 11, 2008

Related U.S. Application Data

(60) Provisional application No. 60/892,881, filed on Mar. 5, 2007.

(51) Int. Cl.
*G06K 9/68* (2006.01)
*G06K 9/62* (2006.01)
*G06K 9/40* (2006.01)

(52) U.S. Cl.
USPC ............ 382/226; 382/224; 382/227; 382/274

(58) Field of Classification Search
USPC .................................. 382/224, 227, 274, 226
See application file for complete search history.

(56) References Cited

U.S. PATENT DOCUMENTS

| | | |
|---|---|---|
| 4,047,187 A | 9/1977 | Mashimo et al. |
| 4,317,991 A | 3/1982 | Stauffer |
| 4,367,027 A | 1/1983 | Stauffer |
| RE31,370 E | 9/1983 | Mashimo et al. |
| 4,448,510 A | 5/1984 | Murakoshi |
| 4,456,354 A | 6/1984 | Mizokami |
| 4,638,364 A | 1/1987 | Hiramatsu |
| 4,690,536 A | 9/1987 | Nakai et al. |
| 4,796,043 A | 1/1989 | Izumi et al. |
| 4,970,663 A | 11/1990 | Bedell et al. |
| 4,970,683 A | 11/1990 | Harshaw et al. |
| 4,975,969 A | 12/1990 | Tal |

(Continued)

FOREIGN PATENT DOCUMENTS

| | | |
|---|---|---|
| EP | 1128316 A1 | 8/2001 |
| EP | 1626569 A1 | 2/2006 |

(Continued)

OTHER PUBLICATIONS

Chantler et al., "Classifying surface texture while simultaneously estimating illumination direction," International Journal of Computer Vision, 62(1-2), 83-96. Special Issue on Texture Analysis and Synthesis, 2005.*

(Continued)

*Primary Examiner* — Anand Bhatnagar
*Assistant Examiner* — Soo Park
(74) *Attorney, Agent, or Firm* — Andrew V. Smith

(57) ABSTRACT

A face illumination normalization method includes acquiring a digital image including a face that appears to be illuminated unevenly. One or more uneven illumination classifier programs are applied to the face data to determine the presence of the face within the digital image and/or the uneven illumination condition of the face. The uneven illumination condition may be corrected to thereby generate a corrected face image appearing to have more uniform illumination, for example, to enhance face recognition.

30 Claims, 14 Drawing Sheets

U.S. PATENT DOCUMENTS

| | | | |
|---|---|---|---|
| 5,008,946 A | 4/1991 | Ando |
| 5,018,017 A | 5/1991 | Sasaki et al. |
| RE33,682 E | 9/1991 | Hiramatsu |
| 5,051,770 A | 9/1991 | Cornuejols |
| 5,063,603 A | 11/1991 | Burt |
| 5,111,231 A | 5/1992 | Tokunaga |
| 5,150,432 A | 9/1992 | Ueno et al. |
| 5,161,204 A | 11/1992 | Hutcheson et al. |
| 5,164,831 A | 11/1992 | Kuchta et al. |
| 5,164,992 A | 11/1992 | Turk et al. |
| 5,227,837 A | 7/1993 | Terashita |
| 5,280,530 A | 1/1994 | Trew et al. |
| 5,291,234 A | 3/1994 | Shindo et al. |
| 5,305,048 A | 4/1994 | Suzuki et al. |
| 5,311,240 A | 5/1994 | Wheeler |
| 5,331,544 A | 7/1994 | Lu et al. |
| 5,353,058 A | 10/1994 | Takei |
| 5,384,615 A | 1/1995 | Hsieh et al. |
| 5,384,912 A | 1/1995 | Ogrinc et al. |
| 5,430,809 A | 7/1995 | Tomitaka |
| 5,432,863 A | 7/1995 | Benati et al. |
| 5,450,504 A | 9/1995 | Calia |
| 5,465,308 A | 11/1995 | Hutcheson et al. |
| 5,488,429 A | 1/1996 | Kojima et al. |
| 5,493,409 A | 2/1996 | Maeda et al. |
| 5,496,106 A | 3/1996 | Anderson |
| 5,500,671 A | 3/1996 | Andersson et al. |
| 5,576,759 A | 11/1996 | Kawamura et al. |
| 5,633,678 A | 5/1997 | Parulski et al. |
| 5,638,136 A | 6/1997 | Kojima et al. |
| 5,638,139 A | 6/1997 | Clatanoff et al. |
| 5,652,669 A | 7/1997 | Liedenbaum |
| 5,680,481 A | 10/1997 | Prasad et al. |
| 5,684,509 A | 11/1997 | Hatanaka et al. |
| 5,706,362 A | 1/1998 | Yabe |
| 5,710,833 A | 1/1998 | Moghaddam et al. |
| 5,715,325 A | 2/1998 | Bang et al. |
| 5,724,456 A | 3/1998 | Boyack et al. |
| 5,745,668 A | 4/1998 | Poggio et al. |
| 5,764,803 A | 6/1998 | Jacquin et al. |
| 5,771,307 A | 6/1998 | Lu et al. |
| 5,774,129 A | 6/1998 | Poggio et al. |
| 5,774,591 A | 6/1998 | Black et al. |
| 5,774,747 A | 6/1998 | Ishihara et al. |
| 5,774,754 A | 6/1998 | Ootsuka |
| 5,781,650 A | 7/1998 | Lobo et al. |
| 5,802,208 A | 9/1998 | Podilchuk et al. |
| 5,802,220 A | 9/1998 | Black et al. |
| 5,812,193 A | 9/1998 | Tomitaka et al. |
| 5,818,975 A | 10/1998 | Goodwin et al. |
| 5,835,616 A | 11/1998 | Lobo et al. |
| 5,842,194 A | 11/1998 | Arbuckle |
| 5,844,573 A | 12/1998 | Poggio et al. |
| 5,850,470 A | 12/1998 | Kung et al. |
| 5,852,669 A | 12/1998 | Eleftheriadis et al. |
| 5,852,823 A | 12/1998 | De Bonet |
| RE36,041 E | 1/1999 | Turk et al. |
| 5,870,138 A | 2/1999 | Smith et al. |
| 5,905,807 A | 5/1999 | Kado et al. |
| 5,911,139 A | 6/1999 | Jain et al. |
| 5,966,549 A | 10/1999 | Hara et al. |
| 5,978,519 A | 11/1999 | Bollman et al. |
| 5,991,456 A | 11/1999 | Rahman et al. |
| 6,028,960 A | 2/2000 | Graf et al. |
| 6,035,072 A | 3/2000 | Read |
| 6,035,074 A | 3/2000 | Fujimoto et al. |
| 6,053,268 A | 4/2000 | Yamada |
| 6,061,055 A | 5/2000 | Marks |
| 6,072,094 A | 6/2000 | Karady et al. |
| 6,097,470 A | 8/2000 | Buhr et al. |
| 6,101,271 A | 8/2000 | Yamashita et al. |
| 6,108,437 A | 8/2000 | Lin |
| 6,128,397 A | 10/2000 | Baluja et al. |
| 6,128,398 A | 10/2000 | Kuperstein et al. |
| 6,134,339 A | 10/2000 | Luo |
| 6,148,092 A | 11/2000 | Qian |
| 6,151,073 A | 11/2000 | Steinberg et al. |
| 6,173,068 B1 | 1/2001 | Prokoski |
| 6,188,777 B1 | 2/2001 | Darrell et al. |
| 6,192,149 B1 | 2/2001 | Eschbach et al. |
| 6,246,779 B1 | 6/2001 | Fukui et al. |
| 6,246,790 B1 | 6/2001 | Huang et al. |
| 6,249,315 B1 | 6/2001 | Holm |
| 6,252,976 B1 | 6/2001 | Schildkraut et al. |
| 6,263,113 B1 | 7/2001 | Abdel-Mottaleb et al. |
| 6,268,939 B1 | 7/2001 | Klassen et al. |
| 6,278,491 B1 | 8/2001 | Wang et al. |
| 6,282,317 B1 | 8/2001 | Luo et al. |
| 6,301,370 B1 | 10/2001 | Steffens et al. |
| 6,301,440 B1 | 10/2001 | Bolle et al. |
| 6,332,033 B1 | 12/2001 | Qian |
| 6,349,373 B2 | 2/2002 | Sitka et al. |
| 6,351,556 B1 | 2/2002 | Loui et al. |
| 6,393,148 B1 | 5/2002 | Bhaskar |
| 6,400,830 B1 | 6/2002 | Christian et al. |
| 6,404,900 B1 | 6/2002 | Qian et al. |
| 6,407,777 B1 | 6/2002 | DeLuca |
| 6,421,468 B1 | 7/2002 | Ratnakar et al. |
| 6,426,779 B1 | 7/2002 | Noguchi et al. |
| 6,438,234 B1 | 8/2002 | Gisin et al. |
| 6,438,264 B1 | 8/2002 | Gallagher et al. |
| 6,456,732 B1 | 9/2002 | Kimbell et al. |
| 6,459,436 B1 | 10/2002 | Kumada et al. |
| 6,463,163 B1 | 10/2002 | Kresch |
| 6,473,199 B1 | 10/2002 | Gilman et al. |
| 6,501,857 B1 | 12/2002 | Gotsman et al. |
| 6,502,107 B1 | 12/2002 | Nishida |
| 6,504,942 B1 | 1/2003 | Hong et al. |
| 6,504,951 B1 | 1/2003 | Luo et al. |
| 6,516,154 B1 | 2/2003 | Parulski et al. |
| 6,526,161 B1 | 2/2003 | Yan |
| 6,529,630 B1 | 3/2003 | Kinjo |
| 6,549,641 B2 | 4/2003 | Ishikawa et al. |
| 6,556,708 B1 | 4/2003 | Christian et al. |
| 6,564,225 B1 | 5/2003 | Brogliatti et al. |
| 6,567,983 B1 | 5/2003 | Shiimori |
| 6,587,119 B1 | 7/2003 | Anderson et al. |
| 6,606,398 B2 | 8/2003 | Cooper |
| 6,633,655 B1 | 10/2003 | Hong et al. |
| 6,661,907 B2 | 12/2003 | Ho et al. |
| 6,697,503 B2 | 2/2004 | Matsuo et al. |
| 6,697,504 B2 | 2/2004 | Tsai |
| 6,700,999 B1 | 3/2004 | Yang |
| 6,747,690 B2 | 6/2004 | Molgaard |
| 6,754,368 B1 | 6/2004 | Cohen |
| 6,754,389 B1 | 6/2004 | Dimitrova et al. |
| 6,760,465 B2 | 7/2004 | McVeigh et al. |
| 6,760,485 B1 | 7/2004 | Gilman et al. |
| 6,765,612 B1 | 7/2004 | Anderson et al. |
| 6,778,216 B1 | 8/2004 | Lin |
| 6,792,135 B1 | 9/2004 | Toyama |
| 6,801,250 B1 | 10/2004 | Miyashita |
| 6,816,611 B1 | 11/2004 | Hagiwara et al. |
| 6,829,009 B2 | 12/2004 | Sugimoto |
| 6,850,274 B1 | 2/2005 | Silverbrook et al. |
| 6,876,755 B1 | 4/2005 | Taylor et al. |
| 6,879,705 B1 | 4/2005 | Tao et al. |
| 6,885,760 B2 | 4/2005 | Yamada et al. |
| 6,900,840 B1 | 5/2005 | Schinner et al. |
| 6,937,773 B1 | 8/2005 | Nozawa et al. |
| 6,940,545 B1 | 9/2005 | Ray et al. |
| 6,959,109 B2 | 10/2005 | Moustafa |
| 6,965,684 B2 | 11/2005 | Chen et al. |
| 6,977,687 B1 | 12/2005 | Suh |
| 6,993,157 B1 | 1/2006 | Oue et al. |
| 7,003,135 B2 | 2/2006 | Hsieh et al. |
| 7,020,337 B2 | 3/2006 | Viola et al. |
| 7,027,619 B2 | 4/2006 | Pavlidis et al. |
| 7,027,621 B1 | 4/2006 | Prokoski |
| 7,034,848 B2 | 4/2006 | Sobol |
| 7,035,456 B2 | 4/2006 | Lestideau |
| 7,035,462 B2 | 4/2006 | White et al. |
| 7,035,467 B2 | 4/2006 | Nicponski |
| 7,038,709 B1 | 5/2006 | Verghese |
| 7,038,715 B1 | 5/2006 | Flinchbaugh |
| 7,039,222 B2 | 5/2006 | Simon et al. |
| 7,042,505 B1 | 5/2006 | DeLuca |

| Patent No. | Date | Inventor |
|---|---|---|
| 7,042,511 B2 | 5/2006 | Lin |
| 7,043,465 B2 | 5/2006 | Pirim |
| 7,050,607 B2 | 5/2006 | Li et al. |
| 7,057,653 B1 | 6/2006 | Kubo |
| 7,064,776 B2 | 6/2006 | Sumi et al. |
| 7,082,212 B2 | 7/2006 | Liu et al. |
| 7,099,510 B2 | 8/2006 | Jones et al. |
| 7,106,374 B1 | 9/2006 | Bandera et al. |
| 7,106,887 B2 | 9/2006 | Kinjo |
| 7,110,569 B2 | 9/2006 | Brodsky et al. |
| 7,110,575 B2 | 9/2006 | Chen et al. |
| 7,113,641 B1 | 9/2006 | Eckes et al. |
| 7,119,838 B2 | 10/2006 | Zanzucchi et al. |
| 7,120,279 B2 | 10/2006 | Chen et al. |
| 7,151,843 B2 | 12/2006 | Rui et al. |
| 7,158,680 B2 | 1/2007 | Pace |
| 7,162,076 B2 | 1/2007 | Liu |
| 7,162,101 B2 | 1/2007 | Itokawa et al. |
| 7,171,023 B2 | 1/2007 | Kim et al. |
| 7,171,025 B2 | 1/2007 | Rui et al. |
| 7,190,829 B2 | 3/2007 | Zhang et al. |
| 7,194,114 B2 | 3/2007 | Schneiderman |
| 7,200,249 B2 | 4/2007 | Okubo et al. |
| 7,206,461 B2 | 4/2007 | Steinberg et al. |
| 7,218,759 B1 | 5/2007 | Ho et al. |
| 7,227,976 B1 | 6/2007 | Jung et al. |
| 7,254,257 B2 | 8/2007 | Kim et al. |
| 7,269,292 B2 | 9/2007 | Steinberg |
| 7,274,822 B2 | 9/2007 | Zhang et al. |
| 7,274,832 B2 | 9/2007 | Nicponski |
| 7,295,233 B2 | 11/2007 | Steinberg et al. |
| 7,308,156 B2 | 12/2007 | Steinberg |
| 7,310,450 B2 | 12/2007 | Steinberg et al. |
| 7,315,630 B2 | 1/2008 | Steinberg et al. |
| 7,315,631 B1 | 1/2008 | Corcoran et al. |
| 7,315,658 B2 | 1/2008 | Steinberg et al. |
| 7,317,815 B2 | 1/2008 | Steinberg et al. |
| 7,336,821 B2 | 2/2008 | Ciuc et al. |
| 7,340,109 B2 | 3/2008 | Steinberg et al. |
| 7,352,394 B1 | 4/2008 | DeLuca et al. |
| 7,362,368 B2 | 4/2008 | Steinberg et al. |
| 7,369,712 B2 | 5/2008 | Steinberg et al. |
| 7,403,643 B2 | 7/2008 | Ianculescu et al. |
| 7,424,170 B2 | 9/2008 | Steinberg et al. |
| 7,436,998 B2 | 10/2008 | Steinberg et al. |
| 7,440,593 B1 | 10/2008 | Steinberg et al. |
| 7,460,694 B2 | 12/2008 | Corcoran et al. |
| 7,460,695 B2 | 12/2008 | Steinberg et al. |
| 7,466,866 B2 | 12/2008 | Steinberg |
| 7,469,055 B2 | 12/2008 | Corcoran et al. |
| 7,469,071 B2 | 12/2008 | Drimbarean et al. |
| 7,471,846 B2 | 12/2008 | Steinberg et al. |
| 7,474,341 B2 | 1/2009 | DeLuca et al. |
| 7,506,057 B2 | 3/2009 | Bigioi et al. |
| 7,515,740 B2 | 4/2009 | Corcoran et al. |
| 7,519,200 B2 * | 4/2009 | Gokturk et al. ............... 382/118 |
| 7,536,036 B2 | 5/2009 | Steinberg et al. |
| 7,536,060 B2 | 5/2009 | Steinberg et al. |
| 7,536,061 B2 | 5/2009 | Steinberg et al. |
| 7,545,995 B2 | 6/2009 | Steinberg et al. |
| 7,551,754 B2 | 6/2009 | Steinberg et al. |
| 7,551,755 B1 | 6/2009 | Steinberg et al. |
| 7,551,800 B2 | 6/2009 | Corcoran et al. |
| 7,555,148 B1 | 6/2009 | Steinberg et al. |
| 7,558,408 B1 | 7/2009 | Steinberg et al. |
| 7,564,994 B1 | 7/2009 | Steinberg et al. |
| 7,565,030 B2 | 7/2009 | Steinberg et al. |
| 7,574,016 B2 | 8/2009 | Steinberg et al. |
| 7,587,068 B1 | 9/2009 | Steinberg et al. |
| 7,587,085 B2 | 9/2009 | Steinberg et al. |
| 7,590,305 B2 | 9/2009 | Steinberg et al. |
| 7,599,577 B2 | 10/2009 | Ciuc et al. |
| 7,606,417 B2 | 10/2009 | Steinberg et al. |
| 7,612,794 B2 | 11/2009 | He et al. |
| 7,616,233 B2 | 11/2009 | Steinberg et al. |
| 7,619,665 B1 | 11/2009 | DeLuca |
| 7,620,214 B2 | 11/2009 | Chen et al. |
| 7,620,218 B2 | 11/2009 | Steinberg et al. |
| 7,630,006 B2 | 12/2009 | DeLuca et al. |
| 7,630,527 B2 | 12/2009 | Steinberg et al. |
| 7,634,109 B2 | 12/2009 | Steinberg et al. |
| 7,636,485 B2 | 12/2009 | Simon et al. |
| 7,636,486 B2 | 12/2009 | Steinberg et al. |
| 7,639,888 B2 | 12/2009 | Steinberg et al. |
| 7,639,889 B2 | 12/2009 | Steinberg et al. |
| 7,660,478 B2 | 2/2010 | Steinberg et al. |
| 7,676,108 B2 | 3/2010 | Steinberg et al. |
| 7,676,110 B2 | 3/2010 | Steinberg et al. |
| 7,680,342 B2 | 3/2010 | Steinberg et al. |
| 7,684,630 B2 | 3/2010 | Steinberg |
| 7,685,341 B2 | 3/2010 | Steinberg et al. |
| 7,689,009 B2 | 3/2010 | Corcoran et al. |
| 7,692,696 B2 | 4/2010 | Steinberg et al. |
| 7,693,311 B2 | 4/2010 | Steinberg et al. |
| 7,694,048 B2 | 4/2010 | Steinberg et al. |
| 7,697,778 B2 | 4/2010 | Steinberg et al. |
| 7,702,136 B2 | 4/2010 | Steinberg et al. |
| 7,702,236 B2 | 4/2010 | Steinberg et al. |
| 7,715,597 B2 | 5/2010 | Costache et al. |
| 7,746,385 B2 | 6/2010 | Steinberg et al. |
| 7,747,596 B2 | 6/2010 | Bigioi et al. |
| 7,773,118 B2 | 8/2010 | Florea et al. |
| 7,787,022 B2 | 8/2010 | Steinberg et al. |
| 7,792,335 B2 | 9/2010 | Steinberg et al. |
| 7,792,970 B2 | 9/2010 | Bigioi et al. |
| 7,796,816 B2 | 9/2010 | Steinberg et al. |
| 7,796,822 B2 | 9/2010 | Steinberg et al. |
| 7,804,531 B2 | 9/2010 | DeLuca |
| 7,804,983 B2 | 9/2010 | Steinberg |
| 7,809,162 B2 | 10/2010 | Steinberg et al. |
| 7,822,234 B2 | 10/2010 | Steinberg et al. |
| 7,822,235 B2 | 10/2010 | Steinberg et al. |
| 7,844,076 B2 | 11/2010 | Corcoran et al. |
| 7,844,135 B2 | 11/2010 | Steinberg et al. |
| 7,847,839 B2 | 12/2010 | DeLuca et al. |
| 7,847,840 B2 | 12/2010 | DeLuca et al. |
| 7,848,549 B2 | 12/2010 | Steinberg et al. |
| 7,852,384 B2 | 12/2010 | DeLuca et al. |
| 7,853,043 B2 | 12/2010 | Steinberg et al. |
| 7,855,737 B2 | 12/2010 | Petrescu et al. |
| 7,860,274 B2 | 12/2010 | Steinberg et al. |
| 7,864,990 B2 | 1/2011 | Corcoran et al. |
| 7,865,036 B2 | 1/2011 | Ciuc et al. |
| 7,868,922 B2 | 1/2011 | Ciuc et al. |
| 7,869,628 B2 | 1/2011 | Corcoran et al. |
| 8,050,466 B2 | 11/2011 | Corcoran et al. |
| 8,199,979 B2 | 6/2012 | Steinberg et al. |
| 2001/0005222 A1 | 6/2001 | Yamaguchi |
| 2001/0028731 A1 | 10/2001 | Covell et al. |
| 2001/0031142 A1 | 10/2001 | Whiteside |
| 2001/0038712 A1 | 11/2001 | Loce et al. |
| 2001/0038714 A1 | 11/2001 | Masumoto et al. |
| 2002/0105662 A1 | 8/2002 | Patton et al. |
| 2002/0106114 A1 | 8/2002 | Yan et al. |
| 2002/0114535 A1 | 8/2002 | Luo |
| 2002/0118287 A1 | 8/2002 | Grosvenor et al. |
| 2002/0136433 A1 | 9/2002 | Lin |
| 2002/0150662 A1 | 10/2002 | Dewis et al. |
| 2002/0154793 A1 | 10/2002 | Hillhouse et al. |
| 2002/0168108 A1 | 11/2002 | Loui et al. |
| 2002/0172419 A1 | 11/2002 | Lin et al. |
| 2002/0176609 A1 | 11/2002 | Hsieh et al. |
| 2002/0181801 A1 | 12/2002 | Needham et al. |
| 2002/0191861 A1 | 12/2002 | Cheatle |
| 2003/0012414 A1 | 1/2003 | Luo |
| 2003/0023974 A1 | 1/2003 | Dagtas et al. |
| 2003/0025812 A1 | 2/2003 | Slatter |
| 2003/0035573 A1 | 2/2003 | Duta et al. |
| 2003/0048950 A1 | 3/2003 | Savakis et al. |
| 2003/0052991 A1 | 3/2003 | Stavely et al. |
| 2003/0059107 A1 | 3/2003 | Sun et al. |
| 2003/0059121 A1 | 3/2003 | Savakis et al. |
| 2003/0071908 A1 | 4/2003 | Sannoh et al. |
| 2003/0084065 A1 | 5/2003 | Lin et al. |
| 2003/0107649 A1 | 6/2003 | Flickner et al. |
| 2003/0118216 A1 | 6/2003 | Goldberg |
| 2003/0123713 A1 | 7/2003 | Geng |
| 2003/0123751 A1 | 7/2003 | Krishnamurthy et al. |

| | | |
|---|---|---|
| 2003/0142209 A1 | 7/2003 | Yamazaki et al. |
| 2003/0151674 A1 | 8/2003 | Lin |
| 2003/0169907 A1 | 9/2003 | Edwards et al. |
| 2003/0202715 A1 | 10/2003 | Kinjo |
| 2004/0008258 A1 | 1/2004 | Aas et al. |
| 2004/0022435 A1 | 2/2004 | Ishida |
| 2004/0095359 A1 | 5/2004 | Simon et al. |
| 2004/0120391 A1 | 6/2004 | Lin et al. |
| 2004/0120399 A1 | 6/2004 | Kato |
| 2004/0170397 A1 | 9/2004 | Ono |
| 2004/0175021 A1 | 9/2004 | Porter et al. |
| 2004/0179719 A1 | 9/2004 | Chen et al. |
| 2004/0207722 A1 | 10/2004 | Koyama et al. |
| 2004/0218832 A1 | 11/2004 | Luo et al. |
| 2004/0223649 A1 | 11/2004 | Zacks et al. |
| 2004/0228505 A1 | 11/2004 | Sugimoto |
| 2004/0264744 A1 | 12/2004 | Zhang et al. |
| 2005/0013479 A1 | 1/2005 | Xiao et al. |
| 2005/0031224 A1 | 2/2005 | Prilutsky et al. |
| 2005/0041121 A1 | 2/2005 | Steinberg et al. |
| 2005/0068446 A1 | 3/2005 | Steinberg et al. |
| 2005/0068452 A1 | 3/2005 | Steinberg et al. |
| 2005/0069208 A1 | 3/2005 | Morisada |
| 2005/0089218 A1 | 4/2005 | Chiba |
| 2005/0104848 A1 | 5/2005 | Yamaguchi et al. |
| 2005/0105780 A1 | 5/2005 | Ioffe |
| 2005/0140801 A1 | 6/2005 | Prilutsky et al. |
| 2005/0185054 A1 | 8/2005 | Edwards et al. |
| 2005/0275721 A1 | 12/2005 | Ishii |
| 2006/0006077 A1 | 1/2006 | Mosher et al. |
| 2006/0008152 A1 | 1/2006 | Kumar et al. |
| 2006/0008173 A1 | 1/2006 | Matsugu et al. |
| 2006/0018517 A1 | 1/2006 | Chen et al. |
| 2006/0029265 A1 | 2/2006 | Kim et al. |
| 2006/0039690 A1 | 2/2006 | Steinberg et al. |
| 2006/0050933 A1 | 3/2006 | Adam et al. |
| 2006/0093238 A1 | 5/2006 | Steinberg et al. |
| 2006/0098875 A1 | 5/2006 | Sugimoto |
| 2006/0098890 A1 | 5/2006 | Steinberg et al. |
| 2006/0110014 A1 | 5/2006 | Philomin et al. |
| 2006/0120599 A1 | 6/2006 | Steinberg et al. |
| 2006/0140455 A1 | 6/2006 | Costache et al. |
| 2006/0147192 A1 | 7/2006 | Zhang et al. |
| 2006/0177100 A1 | 8/2006 | Zhu et al. |
| 2006/0177131 A1 | 8/2006 | Porikli |
| 2006/0203106 A1 | 9/2006 | Lawrence et al. |
| 2006/0203107 A1 | 9/2006 | Steinberg et al. |
| 2006/0203108 A1 | 9/2006 | Steinberg et al. |
| 2006/0204034 A1 | 9/2006 | Steinberg et al. |
| 2006/0204054 A1 | 9/2006 | Steinberg et al. |
| 2006/0204055 A1 | 9/2006 | Steinberg et al. |
| 2006/0204056 A1 | 9/2006 | Steinberg et al. |
| 2006/0204057 A1 | 9/2006 | Steinberg |
| 2006/0204058 A1 | 9/2006 | Kim et al. |
| 2006/0204110 A1 | 9/2006 | Steinberg et al. |
| 2006/0210264 A1 | 9/2006 | Saga |
| 2006/0215924 A1 | 9/2006 | Steinberg et al. |
| 2006/0248029 A1* | 11/2006 | Liu et al. .................. 706/20 |
| 2006/0257047 A1 | 11/2006 | Kameyama et al. |
| 2006/0268150 A1 | 11/2006 | Kameyama et al. |
| 2006/0269270 A1 | 11/2006 | Yoda et al. |
| 2006/0280380 A1 | 12/2006 | Li |
| 2006/0285754 A1 | 12/2006 | Steinberg et al. |
| 2006/0291739 A1 | 12/2006 | Li et al. |
| 2007/0018966 A1 | 1/2007 | Blythe et al. |
| 2007/0070440 A1 | 3/2007 | Li et al. |
| 2007/0071347 A1 | 3/2007 | Li et al. |
| 2007/0091203 A1 | 4/2007 | Peker et al. |
| 2007/0098303 A1 | 5/2007 | Gallagher et al. |
| 2007/0110305 A1 | 5/2007 | Corcoran et al. |
| 2007/0116379 A1 | 5/2007 | Corcoran et al. |
| 2007/0116380 A1 | 5/2007 | Ciuc et al. |
| 2007/0122056 A1 | 5/2007 | Steinberg et al. |
| 2007/0133901 A1 | 6/2007 | Aiso |
| 2007/0154095 A1 | 7/2007 | Cao et al. |
| 2007/0154096 A1 | 7/2007 | Cao et al. |
| 2007/0160307 A1 | 7/2007 | Steinberg et al. |
| 2007/0189606 A1 | 8/2007 | Ciuc et al. |
| 2007/0189748 A1 | 8/2007 | Drimbarean et al. |
| 2007/0189757 A1 | 8/2007 | Steinberg et al. |
| 2007/0195996 A1* | 8/2007 | Kitamura ................... 382/103 |
| 2007/0201724 A1 | 8/2007 | Steinberg et al. |
| 2007/0253638 A1 | 11/2007 | Steinberg et al. |
| 2007/0269108 A1 | 11/2007 | Steinberg et al. |
| 2007/0296833 A1 | 12/2007 | Corcoran et al. |
| 2008/0013798 A1 | 1/2008 | Ionita et al. |
| 2008/0013799 A1 | 1/2008 | Steinberg et al. |
| 2008/0031498 A1 | 2/2008 | Corcoran et al. |
| 2008/0037827 A1 | 2/2008 | Corcoran et al. |
| 2008/0037838 A1 | 2/2008 | Ianculescu et al. |
| 2008/0037839 A1 | 2/2008 | Corcoran et al. |
| 2008/0037840 A1 | 2/2008 | Steinberg et al. |
| 2008/0043121 A1 | 2/2008 | Prilutsky et al. |
| 2008/0043122 A1 | 2/2008 | Steinberg et al. |
| 2008/0049970 A1 | 2/2008 | Ciuc et al. |
| 2008/0055433 A1 | 3/2008 | Steinberg et al. |
| 2008/0075385 A1 | 3/2008 | David et al. |
| 2008/0112599 A1 | 5/2008 | Nanu et al. |
| 2008/0143854 A1 | 6/2008 | Steinberg et al. |
| 2008/0144966 A1 | 6/2008 | Steinberg et al. |
| 2008/0175481 A1 | 7/2008 | Petrescu et al. |
| 2008/0186389 A1 | 8/2008 | DeLuca et al. |
| 2008/0205712 A1 | 8/2008 | Ionita et al. |
| 2008/0219518 A1 | 9/2008 | Steinberg et al. |
| 2008/0219581 A1 | 9/2008 | Albu et al. |
| 2008/0220750 A1 | 9/2008 | Steinberg et al. |
| 2008/0232711 A1 | 9/2008 | Prilutsky et al. |
| 2008/0240555 A1 | 10/2008 | Nanu et al. |
| 2008/0266419 A1 | 10/2008 | Drimbarean et al. |
| 2008/0267461 A1 | 10/2008 | Ianculescu et al. |
| 2008/0292193 A1 | 11/2008 | Bigioi et al. |
| 2008/0309769 A1 | 12/2008 | Albu et al. |
| 2008/0309770 A1 | 12/2008 | Florea et al. |
| 2008/0316327 A1 | 12/2008 | Steinberg et al. |
| 2008/0316328 A1 | 12/2008 | Steinberg et al. |
| 2008/0317339 A1 | 12/2008 | Steinberg et al. |
| 2008/0317357 A1 | 12/2008 | Steinberg et al. |
| 2008/0317378 A1 | 12/2008 | Steinberg et al. |
| 2008/0317379 A1 | 12/2008 | Steinberg et al. |
| 2009/0002514 A1 | 1/2009 | Steinberg et al. |
| 2009/0003661 A1 | 1/2009 | Ionita et al. |
| 2009/0003708 A1 | 1/2009 | Steinberg et al. |
| 2009/0040342 A1 | 2/2009 | Drimbarean et al. |
| 2009/0052750 A1 | 2/2009 | Steinberg et al. |
| 2009/0080713 A1 | 3/2009 | Bigioi et al. |
| 2009/0080796 A1 | 3/2009 | Capata et al. |
| 2009/0080797 A1 | 3/2009 | Nanu et al. |
| 2009/0115915 A1 | 5/2009 | Steinberg et al. |
| 2009/0123063 A1 | 5/2009 | Ciuc |
| 2009/0167893 A1 | 7/2009 | Susanu et al. |
| 2009/0179998 A1 | 7/2009 | Steinberg et al. |
| 2009/0179999 A1 | 7/2009 | Albu et al. |
| 2009/0185753 A1 | 7/2009 | Albu et al. |
| 2009/0189997 A1 | 7/2009 | Stec et al. |
| 2009/0189998 A1 | 7/2009 | Nanu et al. |
| 2009/0190803 A1 | 7/2009 | Neghina et al. |
| 2009/0196466 A1 | 8/2009 | Capata et al. |
| 2009/0238410 A1 | 9/2009 | Corcoran et al. |
| 2009/0238419 A1 | 9/2009 | Steinberg et al. |
| 2009/0263022 A1 | 10/2009 | Petrescu et al. |
| 2009/0303342 A1 | 12/2009 | Corcoran et al. |
| 2009/0303343 A1 | 12/2009 | Drimbarean et al. |
| 2009/0304278 A1 | 12/2009 | Steinberg et al. |
| 2010/0014721 A1 | 1/2010 | Steinberg et al. |
| 2010/0026831 A1 | 2/2010 | Ciuc et al. |
| 2010/0026832 A1 | 2/2010 | Ciuc et al. |
| 2010/0026833 A1 | 2/2010 | Ciuc et al. |
| 2010/0039520 A1 | 2/2010 | Nanu et al. |
| 2010/0039525 A1 | 2/2010 | Steinberg et al. |
| 2010/0053362 A1 | 3/2010 | Nanu et al. |
| 2010/0053367 A1 | 3/2010 | Nanu et al. |
| 2010/0053368 A1 | 3/2010 | Nanu et al. |
| 2010/0054533 A1 | 3/2010 | Steinberg et al. |
| 2010/0054549 A1 | 3/2010 | Steinberg et al. |
| 2010/0054592 A1 | 3/2010 | Nanu et al. |
| 2010/0060727 A1 | 3/2010 | Steinberg et al. |
| 2010/0066822 A1 | 3/2010 | Steinberg et al. |
| 2010/0141786 A1 | 6/2010 | Bigioi et al. |

| | | | |
|---|---|---|---|
| 2010/0141787 A1 | 6/2010 | Bigioi et al. | |
| 2010/0141798 A1 | 6/2010 | Steinberg et al. | |
| 2010/0146165 A1 | 6/2010 | Steinberg et al. | |
| 2010/0165140 A1 | 7/2010 | Steinberg | |
| 2010/0165150 A1 | 7/2010 | Steinberg et al. | |
| 2010/0182458 A1 | 7/2010 | Steinberg et al. | |
| 2010/0194895 A1 | 8/2010 | Steinberg | |
| 2010/0201826 A1 | 8/2010 | Steinberg et al. | |
| 2010/0201827 A1 | 8/2010 | Steinberg et al. | |
| 2010/0202707 A1 | 8/2010 | Costache et al. | |
| 2010/0220899 A1 | 9/2010 | Steinberg et al. | |
| 2010/0231727 A1 | 9/2010 | Steinberg et al. | |
| 2010/0238309 A1 | 9/2010 | Florea et al. | |
| 2010/0259622 A1 | 10/2010 | Steinberg et al. | |
| 2010/0260414 A1 | 10/2010 | Ciuc | |
| 2010/0271499 A1 | 10/2010 | Steinberg et al. | |
| 2010/0272363 A1 | 10/2010 | Steinberg et al. | |
| 2010/0295959 A1 | 11/2010 | Steinberg et al. | |
| 2010/0321537 A1 | 12/2010 | Zamfir et al. | |
| 2010/0328472 A1 | 12/2010 | Steinberg et al. | |
| 2010/0328486 A1 | 12/2010 | Steinberg et al. | |
| 2010/0329549 A1 | 12/2010 | Steinberg et al. | |
| 2010/0329582 A1 | 12/2010 | Albu et al. | |
| 2011/0002506 A1 | 1/2011 | Ciuc et al. | |
| 2011/0002545 A1 | 1/2011 | Steinberg et al. | |
| 2011/0007174 A1 | 1/2011 | Bacivarov et al. | |
| 2011/0013043 A1 | 1/2011 | Corcoran et al. | |
| 2011/0013044 A1 | 1/2011 | Steinberg et al. | |
| 2011/0025859 A1 | 2/2011 | Steinberg et al. | |
| 2011/0025886 A1 | 2/2011 | Steinberg et al. | |
| 2011/0026780 A1 | 2/2011 | Corcoran et al. | |
| 2011/0033112 A1 | 2/2011 | Steinberg et al. | |
| 2011/0043648 A1 | 2/2011 | Albu et al. | |
| 2011/0050919 A1 | 3/2011 | Albu et al. | |
| 2011/0053654 A1 | 3/2011 | Petrescu et al. | |
| 2011/0055354 A1 | 3/2011 | Bigioi et al. | |

FOREIGN PATENT DOCUMENTS

| | | |
|---|---|---|
| EP | 1887511 A1 | 2/2008 |
| GB | 2370438 A1 | 6/2002 |
| JP | 5260360 A2 | 10/1993 |
| JP | 2001216518 A | 8/2001 |
| JP | 2001283224 A | 10/2001 |
| JP | 25164475 A2 | 6/2005 |
| JP | 26005662 A2 | 1/2006 |
| JP | 26254358 A2 | 9/2006 |
| JP | 2006259974 A | 9/2006 |
| JP | 2006318103 A | 11/2006 |
| JP | 2006319534 A | 11/2006 |
| JP | 2006319870 A | 11/2006 |
| JP | 2006350498 A | 12/2006 |
| JP | 2007006182 A | 1/2007 |
| KR | 1020040034342 A | 4/2004 |
| KR | 1020060003666 A | 1/2011 |
| WO | WO-02052835 A2 | 7/2002 |
| WO | WO-2007095477 A2 | 8/2007 |
| WO | WO-2007095477 A3 | 8/2007 |
| WO | WO-2007095483 A2 | 8/2007 |
| WO | WO-2007095553 A2 | 8/2007 |
| WO | WO-2007095553 A3 | 8/2007 |
| WO | WO-2007142621 A1 | 12/2007 |
| WO | WO-2008015586 A2 | 2/2008 |
| WO | WO-2008015586 A3 | 2/2008 |
| WO | WO-2008018887 A1 | 2/2008 |
| WO | WO-2008023280 A2 | 2/2008 |
| WO | WO 2008/107112 A2 | 9/2008 |
| WO | WO-2008104549 A2 | 9/2008 |
| WO | WO 2008/107112 A3 | 1/2009 |
| WO | WO2010/063463 A2 | 6/2010 |
| WO | WO2010/063463 A3 | 7/2010 |

OTHER PUBLICATIONS

Timo Ahonen, Abdenour Hadid, and Matti Pietikainen, Face description with local binary patterns: Application to face recognition, IEEE Transactions on Pattern Analysis and Machine Intelligence PAMI, vol. 28, pp. 2037-2041, Dec. 2006.

Peter N. Belhumeur, Joao P. Hespanha, and David J. Kriegman, Eigenfaces vs. Fisherfaces: Recognition using Class Specific Linear Projection, Proceedings of the 4th European Conference on Computer Vision, ECCV'96, Apr. 15-18, 1996, Cambridge, UK, pp. 45-58.

Gabriel Costache, Rhys Mulryan, Eran Steinberg, Peter Corcoran, In-camera person-indexing of digital images, Consumer Electronics ICCE '06 Digest of Technical Papers. International Conference on, Jan. 7-11, 2006.

EPO Communication pursuant to Article 94(3) EPC, for European application No. 08 716 106.3, dated Jul. 2, 2010, 6 Pages.

Internet Reference: Google Picassa. Retrieved from the Internet on Apr. 24, 2011, URL:http://picasa.google.com, 13 pages.

Land E.H., An alternative technique for the computation of the designator in the retinex theory of color vision, Academy of Sciences, Physics, USA, vol. 83, pp. 3078-3080, May 1986.

David G. Lowe, Distinctive image features from scale-invariant keypoints, International Journal of Computer Vision, vol. 60 (2), 2004, pp. 91-110. Kluwer Academic Publishers. 2004.

Non-Final Office Action, mailed Aug. 5, 2011 for co-pending U.S. Appl. No. 12/203,807, filed Sep. 3, 2008.

Stephen M. Pizer, E. Philip Amburn, John D. Austin, Robert Cromartie, Ari Geselowitz, Trey Greer, Bart Ter Haar Romeny, John B. Zimmerman, Karel Zuiderveld, Adaptive Histogram Equalization and its Variations, Computer Vision, Graphics, and Image Processing, vol. 39, Issue 3, Sep. 1987, pp. 355-368.

Rainer Lienhart, Chapter 6 Video OCR: A Survey and Practitioner's Guide, Video Mining, Video mining by Azriel Rosenfeld, David Scott Doermann, Daniel Dementhon, Mining (Kluwer International Series in Video Computing), pp. 155-183, Springer, 2003, XP009046500.

Internet Reference: Tessera OptiML FaceTools (2010), Retrieved from the Internet on Mar. 25, 2011, URL:http://tessera.com/technologies/imagingandoptics/Documents/OptiML_faceTools.pdf, 4 pages.

Yen-Yu Lin, Tyng-Luh Liu: Robust Face Detection with Multi-Class Boosting, 2005 IEEE Computer Society Conference on Computer Vision and Pattern Recognition, IEEE, Piscataway, NJ, USA, vol. 1, pp. 680-687, Jun. 20, 2005, XP01 0817339.

PCT Notification of Transmittal of the International Search Report and the Written Opinion of the International Searching Authority, or the Declaration, for PCT Application No. PCT/EP2009/008603, dated Jun. 7, 2010, 13 Pages.

PCT Notification Concerning Transmittal of International Preliminary Report on Patentability (Chapter I of The Patent Cooperation Treaty), for PCT Application No. PCT/EP2009/008603, dated Jun. 16, 2011, 10 Pages.

PCT Written Opinion of the International Search Authority, for PCT Application No. PCT/EP2009/008603, dated Jun. 5, 2010, 8 Pages.

Simon Clippingdale, Takayuki Ito: A unified approach to video face detection, tracking and recognition, Image Processing, 1999. ICIP 99. Proceedings. 1999 International Conference on Kobe, Japan Oct. 24-28, 1999, Piscataway, NJ, USA,IEEE, US LNKD—DOI:10.1109/ICIP.1999.821718, vol. 1, Oct. 24, 1999, pp. 662-666, XP010369207 ISBN: 978-0-7803-5467-8.

G. Shakhnarovich and B. Moghaddam: Chapter 7. Face Recognition in Subspaces, In: Stan Z Li et al: Handbook of Face Recognition, Jan. 1, 2005, Springer, New York , XP002579601 ISBN: 9780387405957 Section 2.1.

Laurenz Wiskott, Jean-Marc Fellous, Norbert Krüger, Christopher Von Der Malsburg: Face recognition by elastic bunch graph matching, Image Processing, 1997. Proceedings, International Conference on Santa Barbara, CA, USA Oct. 29-29, 1997, Los Alamitos, CA, USA,IEEE Comput. Soc, US LNKD—DOI:10.1109/ICIP.1997. 647401, vol. 1, Oct. 26, 1997, pp. 129-132, XP010254125 ISBN: 978-0-8186-8183-7.

Gregory Shakhnarovich, Paul A. Viola, Baback Moghaddam: A unified learning framework for real time face detection and classification, Automatic Face and Gesture Recognition, 2002. Proceedings. Fifth IEEE International Conference on, IEEE, Piscataway, NJ, USA, May 20, 2002, pp. 16-23, XP010949330, ISBN: 978-0-7695-1602-8.

Bas Boom, Robin Van Rootseler, Raymond Veldhuis: Investigating the boosting framework for face recognition, Proceedings of the 28th Symposium on Information Theory in the Benelux, May 24, 2007, pp. 1-8, XP002579602, Enschede, NL.

Lubomir Bourdev, Jonathan Brandt: Robust Object Detection via Soft Cascade, Computer Vision and Pattern Recognition, 2005 IEEE Computer Society Conference on, IEEE, Piscataway, NJ, USA, LNKD—DOI: 10.1109/CVPR.2005.310, vol. 2, Jun. 20, 2005, pp. 236-243, XP010817525, ISBN: 978-0-7695-2372-9.

Vaishak Belle: Detection and Recognition of Human Faces using Random Forests for a Mobile Robot, [Online] Apr. 2008, pp. I-104, XP002579603 RWTH Aachen, De Master of Science Thesis Retrieved from the Internet: URL:http://homas.deselaers.de/teaching/files/belle_master.pdf> [retrieved on Apr. 29, 2010].

P. Corcoran, C. Iancu and G. Costache, Improved hmm based face recognition system. International Conference on Optimization of Electrical and Electronic Equipment, Brasov, Romania, May 2006, 4 Pages.

Patent Abstracts of Japan, Publication No. 2001-216518, Date of publication of application: Aug. 10, 2001, Application No. 2000-028520, for Method and Device for Matching and Recording Medium.

Patent Abstracts of Japan, Publication No. 2001-283224, Date of publication of application: Oct. 12, 2001, Application No. 2000-099625, for Face Collating Method, Recording Medium Stored with the Collating Method and Face Collator.

Patent Abstracts of Japan, Publication No. 2006-259974, Date of publication of application: Mar. 16, 2005, Application No. 2005-074560, for Image-Processing Method and Device.

Non-final Rejection, dated Dec. 29, 2011, for U.S. Appl. No. 12/140,950, filed Jun. 17, 2008.

Final Rejection, dated Jun. 17, 2011, for U.S. Appl. No. 12/506,124, filed Jul. 20, 2009.

Final Rejection, dated Dec. 10, 2010, for U.S. Appl. No. 12/506,124, filed Jul. 20, 2009.

Georghiades, A.S.; Belhumeur, P.N. &Kriegman, D.J., (2001). From few to many: illumination cone models for face recognition under variable lighting and pose, IEEE Trans. Pattern Anal. Mach. Intelligence, vol. 23, No. 6, pp. 643-660.

Nefian, A.V. & Hayes III, M.H. Hidden Markov Models for Face Recognition, Proc. of the IEEE International Conference on Acoustics, Speech, and Signal Processing, ICASSP'98, vol. 5, May 12-15, 1998, Seattle, Washington, USA, pp. 2721-2724.

Ojala, T.; Pietikäinen, M. & Mäenpää, T. A generalized Local Binary Pattern operator for multiresolution gray scale and rotation invariant texture classification, Advances in Pattern Recognition, ICAPR 2001 Proceedings, Springer, 397-406, 2001.

Longbin Chen, Baogang Hu, Lei Zhang, Mingjing Li, Hongjiang Zhang, Face Annotation for Family Photo Album Management, International Journal of Image and Graphics, 2003, pp. 1-14, vol. 3, No. 1. World Scientific Publishing Company.

P. Jonathon Phillips, Patrick J. Flynn, Todd Scruggs, Kevin W. Bowyer, Jin Chang, Kevin Hoffman, Joe Marques, Jaesik Min, William Worek, Overview of the Face Recognition Grand Challenge, Proceedings of the 2005 IEEE Computer Society Conference on Computer Vision and Pattern Recognition (CVPR'05), 8 Pages.

Corcoran, P. & Costache, G. (2005). Automated sorting of consumer image collections using face and peripheral region image classifiers, Consumer Electronics, IEEE Transactions on vol. 51, Issue 3, Aug. 2005, pp. 747-754.

Aoki, Hiroyuki et al., "An Image Storage System Using Complex-Valued Associative Memories, Abstract printed from http://csdl.computer.org/comp/proceedings/icpr/2000/0750/02/07502626abs.htm", International Conference on Pattern Recognition (ICPR '00), 2000, vol. 2.

Batur et al., "Adaptive Active Appearance Models", IEEE Transactions on Image Processing, 2005, pp. 1707-1721, vol. 14—Issue 11.

Beraldin, J.A. et al., "Object Model Creation from Multiple Range Images: Acquisition, Calibration, Model Building and Verification, Abstract printed from http://csdl.computer.org/comp/proceedings/nrc/1997/7943/00/79430326abs.htm", International Conference on Recent Advances in 3-D Digital Imaging and Modeling, 1997.

Beymer, David, "Pose-Invariant face Recognition Using Real and Virtual Views, A.I. Technical Report No. 1574", Mass. Inst. of Tech. Artificial Intelligence Lab., 1996, pp. 1-176.

Buenaposada, J., "Efficiently estimating 1-3,16 facial expression and illumination in appearance-based tracking, Retrieved from the Internet: RL:http://www.bmva.ac.uk/bmvc/2006/ [retrieved on Sep. 1, 2008]", Proc. British machine vision conference, 2006.

Cootes T. et al., "Modeling Facial Shape and Appearance, S. Li and K. K. Jain (Eds.): "Handbook of face recognition", XP002494037", 2005, Chapter 3, Springer.

Cootes, T.F. et al., "A comparative evaluation of active appearance model algorithms", Proc. 9th British Machine Vison Conference. British Machine Vision Association, 1998, pp. 680-689.

Cootes, T.F. et al., "On representing edge structure for model matching", Proc. IEEE Computer Vision and Pattern Recognition, 2001, pp. 1114-1119.

Crowley, J. et al., "Multi-modal tracking of faces for video communication, http://citeseer.ist.psu.edu/crowley97multimodal.html", In Comp. Vision and Patent Recog, 1997.

Dalton, John, "Digital Cameras and Electronic Color Image Acquisition, Abstract printed from http://csdl.computer.org/comp/proceedings/compcon/1996/7414/00/74140431abs.htm", C0MPC0N Spring '96—41st IEEE International Conference, 1996.

Donner, Rene et al., "Fast Active Appearance Model Search Using Canonical Correlation Analysis", IEEE Trans on Pattern Anal. and Mach. Intell., 2006, pp. 1690-1694, vol. 28—Iss 10.

Edwards, G.J. et al., "Advances in active appearance models", International Conference on Computer Vision (ICCV'99), 1999, pp. 137-142.

Edwards, G.J. et al., "Learning to identify and track faces in image sequences, Automatic Face and Gesture Recognition", IEEE Comput. Soc, 1998, pp. 260-265.

Feraud, R. et al., "A Fast and Accurate Face Detector Based on Neural Networks", IEEE Transactions on Pattern Analysis and Machine Intelligence, 2001, pp. 42-53, vol. 23—Issue I.

Fernandez, Anna T. et al., "Synthetic Elevation Beamforming and Image Acquisition Capabilities Using an 8×128 1.75D Array, Abstract Printed from http://www.ieee-uffc.org/archive/uffc/trans/toc/abs/03/t0310040.htm", The Tech. Inst. of Elect. & Elect. Engrs.

Froba, B. et al., "Face detection with the modified census transform", Proceedings of the Sixth IEEE International Conference on Automatic Face and Gesture Recognition, 2004, pp. 91-96.

Froba, B. et al., "Real time face detection, Kauai, Hawai Retrieved from the Internet:URL:http://www.embassi.de/publi/veroeffent/Froeba.pdf [retrieved on Oct. 23, 2007]", Dept. of Applied Electronics, Proceedings of Iasted "Signal and Image Processing", 2002, pp. 1-6.

Garnaoui, H.H. et al., "Visual Masking and the Design of Magnetic Resonance Image Acquisition, Abstract printed from http://csdl.computer.org/comp/proceedings/icip/1995/7310/01/73100625abs.htm", International Conference on Image Processing, 1995, vol. 1.

Gaubatz, Matthew et al., "Automatic Red-Eye Detection and Correction", IEEE ICIP, Proceedings 2002 International Conference on Image Processing, 2002, pp. 1-804-1-807, vol. 2—Issue 3.

Gerbrands, J., "On the Relationships Between SVD, KLT, and PCA", Pattern Recognition, 1981, pp. 375-381, vol. 14, Nos. 1-6.

Goodall, C., "Procrustes Methods in the Statistical Analysis of Shape, Stable URL: http://www.jstor.org/stable/2345744", Journal of the Royal Statistical Society. Series B (Methodological), 1991, pp. 285-339, vol. 53—Issue 2, Blackwell Publishing for the Royal Statistical Society.

Hou, Xinwen et al., "Direct Appearance Models", IEEE, 2001, pp. I-828-I-833.

Hu, Wen-Chen et al., "A Line String Image Representation for Image Storage and Retrieval, Abstract printed from http://csdl.computer.oro/comp/proceedings/icmcs/1997/7819/00/78190434abs.htm", International Conference on Multimedia Computing and systems, 1997.

Huang, J. et al., "Detection of human faces using decision trees, http://doIieeecomputersociety.org/10.1109/Recognition", 2nd International Conference on Automatic Face and Gesture Recognition (FG '96), IEEE Xplore, 2001, p. 248.

Huber, Reinhold et al., "Adaptive Aperture Control for Image Acquisition, Abstract printed from http://csdl.computer.org/comp/proceedings/wacv/2002/1858/00/18580320abs.htm.", Sixth IEEE Workshop on Applications of Computer Vision, 2002.

Jebara, Tony S. et al., "3D Pose Estimation and Normalization for Face Recognition, A Thesis submitted to the Faculty of Graduate Studies and Research in Partial fulfillment of the requirements of the degree of Bachelor of Engineering", Department of Electrical Engineering, 1996, pp. 1-121, McGill University.

Jones, M et al., "Fast multi-view face detection, http://www.merl.com/papers/docs/TR2003-96.pdf", Mitsubishi Electric Research Lab, 2003, 10 pgs.

Kang, Sing Bing et al., "A Multibaseline Stereo System with Active Illumination and Real-Time Image Acquisition, Abstract printed from http://csdl.computer.org/comp/proceedings/iccv/1995/7042/00/70420088abs.htm", Fifth International Conference on Computer Vision, 1995.

Kita, Nobuyuki et al., "Archiving Technology for Plant Inspection Images Captured by Mobile Active Cameras—4D Visible Memory, Abstract printed from http://csdl.computer.org/comp/proceedings/3dpvt/2002/1521/00/15210208abs.htm", 1st International Symposium on 3D Data Processing Visualization and Trans. (3DPVT '02), 2002.

Kozubek, Michal et al., "Automated Multi-view 3D Image Acquisition in Human Genome Research, Abstract printed from http://csdl.computer.org/comp/proceedings/3pvt/2002/1521/00/15210091abs.htm", 1st Intl Symp on 3D Data Proc. Visualization and Trans. (3DPVT '02), 2002.

Krishnan, Arun, "Panoramic Image Acquisition, Abstract printed from http://csdl.computer.org/comp/proceedings/cvpr/1996/7258/00/72580379abs.htm", Conference on Computer Vision and Pattern Recognition (CVPR '96), 1996.

Matkovic, Kresimir et al., "The 3D Wunderkammer an Indexing by Placing Approach to the Image Storage and Retrieval, Abstract http://csdl.computer.org/comp/proceedings/tocg/2003/1942/00/19420034abs.htm", Theory and Practice of Comp. Graphics, 2003, Univ. of Birmingham.

Matthews, I. et al., "Active appearance models revisited, Retrieved from http://www.d.cmu.edu/pub_files/pub4/matthews_iain_2004_2/matthews_iain_2004_2.pdf", International Journal of Computer Vision, 2004, pp. 135-164, vol. 60—Issue 2.

Mekuz, N. et al., "Adaptive Step Size Window Matching for Detection", Proceedings of the 18th International Conference on Pattern Recognition, 2006, pp. 259-262, vol. 2.

Nordstrom, M.M. et al., "The IMM face database an annotated dataset of 240 face images, http://www2.imm.dtu.dk/pubdb/p.php?3160", Informatics and Mathematical Modelling, 2004.

Ohta, Y-I et al., "Color Information for Region Segmentation, XP008026458", Computer Graphics and Image Processing, 1980, pp. 222-241, vol. 13—Issue 3, Academic Press.

Park, Daechul et al., "Lenticular Stereoscopic Imaging and Displaying Techniques with no Special Glasses, Abstract printed from http://csdl.computer.org/comp/proceedings/icip/1995/7310/03/73103137abs.htm", International Conference on Image Processing, 1995, vol. 3.

PCT International Search Report and Written Opinion, PCT/US2006/021393, filed Jun. 2, 2006, entitled, Modification of Post-Viewing Parameters for Digital Images Using Image Region or Feature Information, ISR/WO dated Mar. 29, 2007, 12 pgs.

PCT International Search Report and Written Opinion, PCT/US2006/060392, filed Oct. 31, 2006, entitled, Digital Image Processing using Face Detection and Skin Tone Information, ISR/WO dated Sep. 19, 2008, 9 pgs.

PCT Notification of Transmittal of the International Search Report and the Written Opinion of the International Searching Authority, or the Declaration, for PCT Application No. PCT/EP2007/006540, Nov. 7, 2008, 6 pgs.

PCT Notification of Transmittal of the International Search Report and the Written Opinion of the International Searching Authority, or the Declaration, for PCT Application No. PCT/EP2007/006540, Nov. 8, 2007. 11 pgs.

PCT Notification of Transmittal of the International Search Report and the Written Opinion of the International Searching Authority, or the Declaration, for PCT Application No. PCT/EP2008/001510, dated May 29, 2008, 13 pages.

PCT Notification of Transmittal of the International Search Report and the Written Opinion of the International Searching Authority, or the Declaration, for PCT Application No. PCT/EP2008/052329, dated Sep. 15, 2008, 12 pages.

PCT Notification of Transmittal of the International Search Report and the Written Opinion of the International Searching Authority, or the Declaration, for PCT Application No. PCT/IB2007/003724, dated Aug. 28, 2008, 9 pages.

Romdhani, S. et al., "Face Identification by Fitting a 3D Morphable Model using linear Shape and Texture Error Functions, XP003018283", European Conference on Computer Vision, 2002, pp. 1-15.

Rowley, Henry A. et al., "Neural network-based face detection, ISSN: 0162-8828, DOI: 10.1109/34.655647, Posted online: Aug. 6, 2008. http://ieeexplore.ieee.org/xpl/freeabs_all.jsp?arnumber=655647andisnumber=14286", IEEE Transactions on Pattern Analysis and Machine Intelligence, 1998, pp. 23-38, p. 92, vol. 20—Issue 1.

Ryu et al., "Coarse-to-Fine Classification for Image-Based Face Detection", 1999, p. 92, subsection 8.3, Chapter 6, Carnegie Melon Univ.

Ryu, Hanjin et al., "Coarse-to-Fine Classification for Image-Based Face Detection", Image and video retrieval lecture notes in Computer science, 2006, pp. 291-299, vol. 4071, Springer-Verlag.

Shand, M., "Flexible Image Acquisition Using Reconfigurable Hardware, Abstract printed from http://csdl.computer.org/comp/proceedings/fccm/1995/7086/00/70860125abs.htm", IEEE Symposium of FPGA's for Custom Computing Machines (FCCM '95), 1995.

Sharma, G. et al., "Digital color imaging, [Online]. Available: citeseer.ist.psu.edu/sharma97digital.html", IEEE Transactions on Image Processing, 1997, pp. 901-932, vol. 6—Issue 7.

Shock, D. et al., "Comparison of Rural Remote Site Production of Digital Images Employing a film Digitizer or a Computed Radiography (CR) System, Abstract printed from http://csdl/computer.org/comp/proceedings/imac/1995/7560/00/75600071abs.htm", 4th International Conference on Image Management and Communication ( IMAC '95), 1995.

Sim, T. et al., "The CMU Pose, Illumination, and Expression (PIE) Database of Human Faces Robotics Institute, Tech. Report, CMU-RI-TR-01-02", 2001, -18 pgs, Carnegie Mellon University.

Sim, T. et al., "The CMU Pose, Illumination, and Expression (PIE) database, Automatic Face and Gesture Recognition", Fifth IEEE Intl. Conf, IEEE Piscataway, NJ, USA, 2002, 6 pages.

Skocaj, Danijel, "Range Image Acquisition of Objects with Non-Uniform Albedo Using Structured Light Range Sensor, Abstract printed from http://csdl.computer.org/comp/proceedings/icpr/2000/0750/01/07501778abs.htm", Intl Conf. on Pattern Recognition (ICPR '00), 2000, vol. 1.

Skocaj, Danijel, "Range Image Acquisition of Objects with Non-Uniform Albedo Using Structured Light Range Sensor, Abstract printed from http://csdl.computer.org/comp/proccedings/icpr/2000/0750/01/07501778abs.htm", Intl. Conf. on Pattern Recognition (ICPR '00), 2000, vol. 2.

Smeraldi, F. et al., "Facial feature detection by saccadic exploration of the Gabor decomposition, XP010586874", Image Processing, ICIP 98. Proceedings International Conference on Chicago, IL, USA, IEEE Comput. Soc, 1998, pp. 163-167, vol. 3.

Stegmann, M.B. et al., "A flexible appearance modelling environment, Available: http://www2.imm.dtu.dk/pubdb/p.php?1918", IEEE Transactions on Medical Imaging, 2003, pp. 1319-1331, vol. 22—Issue 10.

Stegmann, M.B. et al., "Multi-band modelling of appearance, XP009104697", Image and Vision Computing, 2003, pp. 61-67, vol. 21—Issue 1.

Sublett, J.W. et al., "Design and Implementation of a Digital Teleultrasound System for Real-Time Remote Diagnosis, Abstract printed from http://csdl.computer.org/comp/proceedings/cbms/1995/7117/00/71170292abs.htm", Eight Annual IEEE Symposium on Computer-Based Medical Systems (CBMS '95), 1995.

Tang, Yuan Y. et al., "Information Acquisition and Storage of Forms in Document Processing, Abstract printed from http://csdl.computer.org/comp/proceedings/icdar/1997/7898/00/7898018abs.htm", 4th Intl. Conf. Document Analysis and Recognition, 1997, vol. I and II, 1 pg.

Tkalcic, M. et al., "Colour spaces perceptual, historical and applicational background, ISBN: 0-7803-7763-X", IEEE, EUROCON, 2003, pp. 304-308, vol. 1.

Twins Crack Face Recognition Puzzle, Internet article http://www.cnn.com/2003/TECH/ptech/03/10/israel.twins.reut/ index.html, printed Mar. 10, 2003, 3 pages.

U.S. Appl. No. 11/554,539, filed Oct. 30, 2006, entitled Digital Image Processing Using Face Detection and Skin Tone Information.

Vuylsteke, P. et al., "Range Image Acquisition with a Single Binary-Encoded Light Pattern, abstract printed from http://csdl.computer.org/comp/trans/tp/1990/02/i0148abs.htm", IEEE Transactions on Pattern Analysis and Machine Intelligence, 1990, 1 page.

Yang, Ming-Hsuan et al., "Detecting Faces in Images: A Survey, ISSN:0162-8828, http://portal.acm.org/citation.cfm?id=505621andcoll=GUIDEanddl=GUIDEandCFID=680-9268and CFTOKEN=82843223.", IEEE Transactions on Pattern Analysis and Machine Intelligence archive, 2002, pp. 34-58, vol. 24—Issue 1, IEEE Computer Society.

Zhang, Jun et al., "Face Recognition: Eigenface, Elastic Matching, and Neural Nets", Proceedings of the IEEE, 1997, pp. 1423-1435, vol. 85—Issue 9.

Bradski Gary et al., "Learning-Based Computer Vision with Intel's Open Source Computer Vision Library", Intel Technology, 2005, pp. 119-130, vol. 9—Issue 2.

Corcoran, P. et al., "Automatic Indexing of Consumer Image Collections Using Person Recognition Techniques", Digest of Technical Papers. International Conference on Consumer Electronics, 2005, pp. 127-128.

Costache, G. et al., "In-Camera Person-Indexing of Digital Images", Digest of Technical Papers. International Conference on Consumer Electronics, 2006, pp. 339-340.

Demirkir, C. et al., "Face detection using boosted tree classifier stages", Proceedings of the IEEE 12th Signal Processing and Communications Applications Conference, 2004, pp. 575-578.

Drimbarean, A.F. et al., "Image Processing Techniques to Detect and Filter Objectionable Images based on Skin Tone and Shape Recognition", International Conference on Consumer Electronics, 2001, pp. 278-279.

Viola, P. et al., "Rapid Object Detection using a Boosted Cascade of Simple Features", Proceedings of the 2001 IEEE Computer Society Conference on Computer Vision and Pattern Recognition, 2001, pp. I-511-I-518, vol. 1.

Viola, P. et al., "Robust Real-Time Face Detection", International Journal of Computer Vision, 2004, pp. 137-154, vol. 57—Issue 2, Kluwer Academic Publishers.

Xin He et al., "Real-Time Human Face Detection in Color Image", International Conference on Machine Learning and Cybernetics. 2003, pp. 2915-2920, vol. 5.

Zhao, W. et al., "Face recognition: A literature survey, ISSN: 0360-0300, http://portal.acm.org/citation.cfm?id=954342 andcoll=GUIDEanddl=GUIDEandCFID=680-9268andCFTOKEN=82843223.", ACM Computing Surveys (CSUR) archive, 2003, pp. 399-458, vol. 35—Issue 4, ACM Press.

Zhu Qiang et al., "Fast Human Detection Using a Cascade of Histograms of Oriented Gradients", Proceedings of the 2006 IEEE Computer Society Conference on Computer Vision and Pattern Recognition, 2006, pp. 1491-1498, IEEE Computer Society.

Final Office Action mailed Nov. 18, 2009, for U.S. Appl. No. 11/554,539, filed Oct. 30, 2006.

Final Office Action mailed Sep. 30, 2010, for U.S. Appl. No. 11/624,683, filed Jan. 18, 2007.

Non-Final Office Action mailed Aug. 19, 2009, for U.S. Appl. No. 11/773,815, filed Jul. 5, 2007.

Non-Final Office Action mailed Aug. 20, 2009, for U.S. Appl. No. 11/773,855, filed Jul. 5, 2007.

Non-Final Office Action mailed Jan. 20, 2010, for U.S. Appl. No. 12/262,024, filed Oct. 30, 2008.

Non-Final Office Action mailed Sep. 8, 2009, for U.S. Appl. No. 11/688,236, filed Mar. 19, 2007.

Non-Final Office Action mailed Sep. 28, 2010, for U.S. Appl. No. 11/752,925, filed May 24, 2007.

Notice of Allowance mailed Oct. 15, 2010, for U.S. Appl. No. 11/554,539, filed Oct. 30, 2006.

Notice of Allowance mailed Sep. 28, 2009, for U.S. Appl. No. 12/262,037, filed Oct. 30, 2008.

PCT International Preliminary Report on Patentability for PCT Application No. PCT/EP2008/0001578, mailed on Sep. 8, 2009, 10 pages.

PCT International Preliminary Report on Patentability for PCT Application No. PCT/EP2008/0052329, mailed on Sep. 1, 2009, 8 pages.

PCT International Search Report and the Written Opinion of the International Searching Authority, for PCT Application No. PCT/EP2008/0001578, dated Oct. 23, 2008, 14 pages.

PCT International Search Report and the Written Opinion of the International Searching Authority, for PCT Application No. PCT/EP2008/0052329, dated Sep. 15, 2008, 10 pages.

Chang Huang, Haizhou Ai, Bo Wu, and Shihong Lao, Boosting Nested Cascade Detector for Multi-View Face Detection, Proceeding, ICPR '04 Proceedings of the Pattern Recognition, 17th International Conference on (ICPR'04) vol. 2—vol. 02, IEEE Computer Society Washington, DC, USA © 2004.

PCT Invitation to Pay Additional Fees and, Where Applicable Protest Fee, for PCT Application No. PCT/EP2008/001578, paper dated Jul. 8, 2008, 5 Pages.

Mitra, S., et al., Gaussian Mixture Models Based on the Frequency Spectra for Human Identification and Illumination Classification Automatic Identification Advanced Technologies, 2005, Fourth IEEE Work Shop on Buffalo, NY, USA Oct. 17-18, 2005, Piscataway, NJ, USA,IEEE, pp. 245-250, XPOI0856528 ISBN: 978-0-7695-2475-7.

Kouzani A Z: Illumination-Effects Compensation in Facial Images Systems, Man and Cybernetics, 1999. IEEE SMC '99 Conference Proceedin GS. 1999 IEEE International Conference on Tokyo, Japan Oct. 12-15, 1999, Piscataway, NJ, USA, IEEE, US, vol. 6, Oct. 12, 1999, pp. 840-844, XPOI0363112, ISBN: 978-0-7803-5731-0.

Soriano, M. et al. Making Saturated Facial Images Useful Again, Proceedings of the Spie, Spie, Bellingham, VA. vol. 3826, Jun. 17, 1999 pp. 113-121, XP002325961 ISSN: 0277-786X.

Sim, T. et al, The CMU Pose, Illumination, and Expression (PIE) database, Automatic Face and Gesture Recognition, 2002. Proceeding, Fifth IEEE International Conference on, IEEE Piscataway, NJ, USA May 20, 2002, pp. 53-58, XPOI10949335, ISBN: 978-0-7695-1602-8.

Matthew Turk, Alex Pentland, Eigenfaces for Recognition, Journal of Cognitive Neuroscience, vol. 3, No. 1, Winter 1991, 71, DOI: 10.1162/jocn.1991.3.1.71.

H. Lai, P. C. Yuen, and G. C. Feng, Face recognition using holistic Fourier invariant features, Pattern Recognition, 2001, vol. 34, pp. 95-109.

Tjahyadi et al., Application of the DCT Energy Histogram for Face Recognition, Proceedings of the 2nd International Conference on Information Technology for Application, (ICITA 2004).

Zhang Lei, Lin Fuzong, Zhang Bo, A CBIR Method Based on Color-Spatial Feature, IEEE Region 10th Ann. Int. Conf. 1999 (TENCON'99, Cheju, Korea, 1999).

Stricker et al., Similarity of color images, SPIE Proc., 1995, pp. 2420.

Lienhart, R., Liang, L., and Kuranov, A., A Detector Tree of Boosted Classifiers for Real-Time Object Detection and Tracking, Proceedings of the 2003 International Conference on Multimedia and Expo—vol. 1, pp. 277-280 (2003), ISBN:0-7803-7965-9, Publisher IEEE Computer Society, Washington, DC, USA.

Huang et al., Image Indexing Using Color Correlograms, Proceedings of the 1997 Conference on Computer Vision and Pattern Recognition (CVPR '97), 1997, pp. 762 et seq.

S. J. Wan, P. Prusinkiewicz, Variance-based color image quantization for frame buffer display, S. K. M. Wong Color Research & Application, vol. 15, Issue 1, Feb. 1990, pp. 52-58.

Tianhorng Chang and C. C. Jay Kuo, Senior Member, IEEE, Texture Analysis and Classification with Tree-Structured Wavelet Transform, IEEE Transactions on Image Processing, vol. 2, No. 4, Oct. 1993, pp. 429-441.

Zhang Lei, Lin Fuzong, Zhang Bo: A CBIR method based on color-spatial feature, IEEE Region 10th Ann. Int. Conf. 1999 (TENCON'99, Cheju, Korea, 1999). 4 Pages.

EPO Communication pursuant to Article 94(3) EPC, including for European patent application No. 08 716 106.3, report dated Jul. 30, 2012, 4 Pages.

Patent Abstracts of Japan, publication No. 2006-119817, published on May 11, 2006, for Image Processor.

Patent Abstracts of Japan, publication No. 2002-024811, published on Jan. 25, 2002, for Shadow Component Removing Device.

Patent Abstracts of Japan, publication No. 2002-015311, published on Jan. 18, 2002, for Image Recognizing Device, Shadow Removing Device, Shadow Removing Method, and Storage Medium.

Patent Abstracts of Japan, publication No. 2004-062651, published on Feb. 26, 2004, for Mage Processor, Image Processing Method, Its Recording Medium and Its Program.

Patent Abstracts of Japan, publication No. 2006-254415, published on Sep. 21, 2006, for Apparatus, Method, and Program for Creating Luminance Conversion Curve.

Patent Abstracts of Japan, publication No. 2005-316743, published on Nov. 11, 2005, for Image Processing Method and Device.

Patent Abstracts of Japan, publication No. 11-146405, published on May 28, 1999, for Video Signal Processor and Color Video Camera Using the Same.

Japanese Patent Abstracts, publication No. 2002-150287, publication date: May 24, 2002, Image Detector, Image Detection Method, Digital Camera and Printer.

Korean Patent Abstracts, publication No. 10-2005-0041772A, publication date May 4, 2005, Method and Device for Detecting Face in Real-Time Through Face Detecting Mode or Face Tracking Mode, and Security Monitoring System Applying the Same.

* cited by examiner

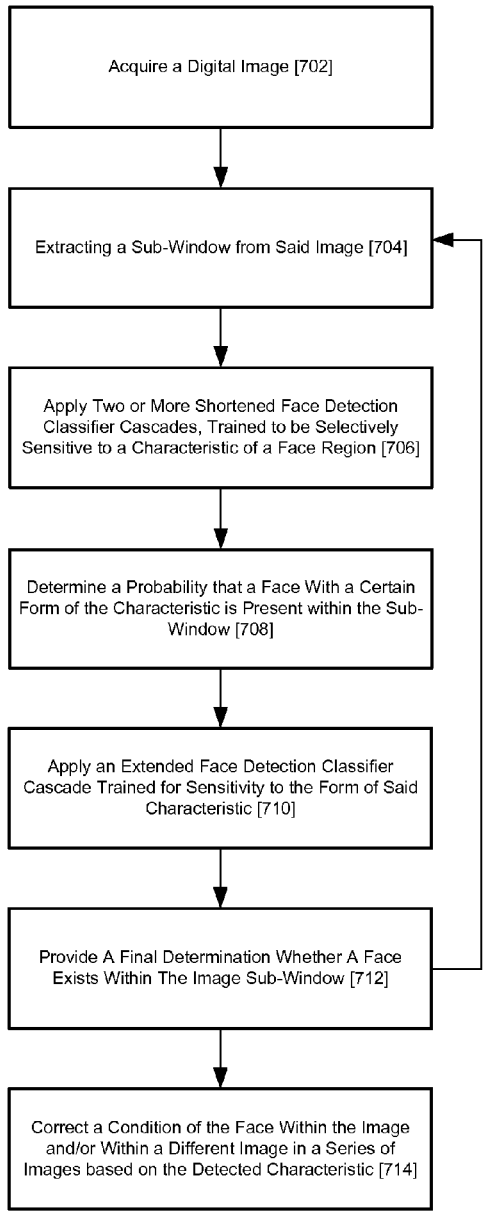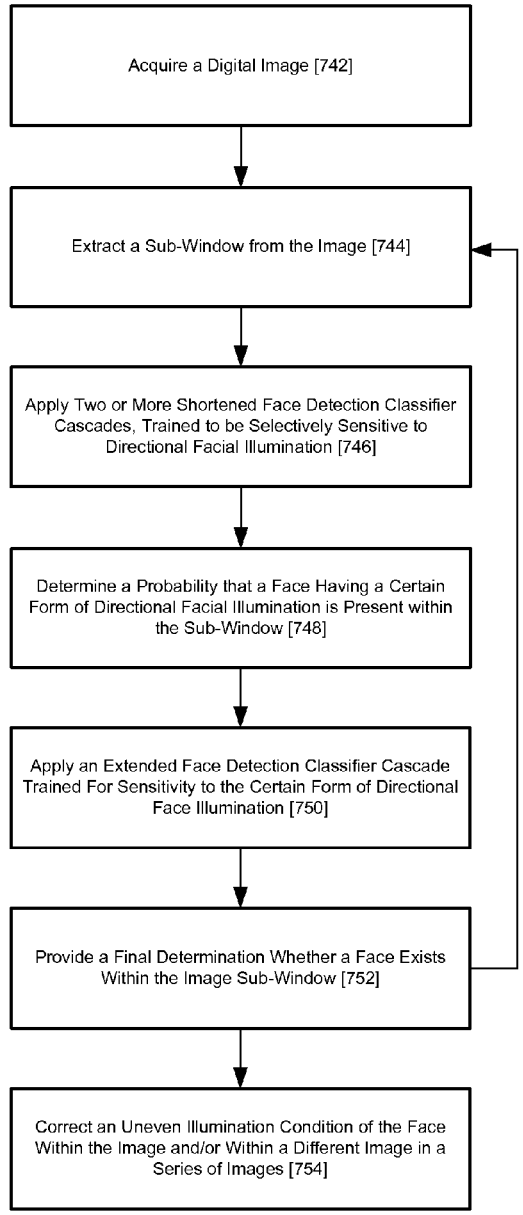
Figure 9A
Figure 9B

ILLUMINATION DETECTION USING CLASSIFIER CHAINS

PRIORITY

This application claims priority to U.S. provisional patent application No. 60/892,881, filed Mar. 5, 2007, which is incorporated by reference.

OTHER RELATED APPLICATIONS

This application is related to U.S. patent application Ser. No. 11/027,001, filed Dec. 29, 2004, and published as 2006/0140455, now U.S. Pat. No. 7,715,597; and U.S. patent application Ser. No. 11/464,083, filed Aug. 11, 2006, now U.S. Pat. No. 7,315,631; which are hereby incorporated by reference.

BACKGROUND

1. Field of the Invention

The invention relates to face detection and recognition, particularly under uneven illumination conditions 2. Description of the Related Art Viola-Jones proposes a classifier chain consisting of a series of sequential feature detectors. The classifier chain rejects image patterns that do not represent faces and accepts image patterns that do represent faces.

A problem in face recognition processes arises when faces that are unevenly illuminated are distributed in a large area of face space making correct classification difficult. Faces with similar illumination tend to be clustered together and correct clustering of images of the same person is difficult. It is desired to be able to detect faces with uneven illumination within images, or where another difficult characteristic of a face exists such as a face having a non-frontal pose. It is also desired to have a method to normalize illumination on faces, for example, for use in face recognition and/or other face-based applications.

SUMMARY OF THE INVENTION

A face illumination normalization method is provided. A digital image is acquired including data corresponding to a face that appears to be illuminated unevenly. One or more uneven illumination classifier programs are applied to the face data, and the face date is identified as corresponding to a face. An uneven illumination condition is also determined for the face as a result of the applying of the one or more uneven illumination classifier programs. The uneven illumination condition of the face is corrected based on the determining to thereby generate a corrected face image appearing to have more uniform illumination. The method also includes electronically storing, transmitting, applying a face recognition program to, editing, or displaying the corrected face image, or combinations thereof.

A face recognition program may be applied to the corrected face image. The detecting of the face and the determining of the uneven illumination condition of the face may be performed simultaneously. A set of feature detector programs are applied to reject non-face data from being identified as face data.

A front illumination classifier program may be also applied to the face data. An illumination condition may be determined based on acceptance of the face data by one of the classifier programs. The digital image may be one of multiple images in a series that include the face, and the correcting may be applied to a different image in the series than the digital image within which the illuminating condition is determined.

The uneven illumination classifier programs may include a top illumination classifier, a bottom illumination classifier, and one or both of right and left illumination classifiers. A front illumination classifier program may be applied to the face data. Two or more full classifier sets may be applied after determining that no single illumination condition applies and that the face data is not rejected as a face.

A face detection method is also provided. The face detection method includes acquiring a digital image and extracting a sub-window from the image. Two or more shortened face detection classifier cascades are applied that are trained to be selectively sensitive to a characteristic of a face region. A probability is determined that a face with a certain form of the characteristic is present within the sub-window. An extended face detection classifier cascade is applied that is trained for sensitivity to the certain form of the characteristic. A final determination is provided that a face exists within the image sub-window. The method is repeated one or more times for one or more further sub-windows from the image and/or one or more further characteristics.

The characteristic or characteristics may include a directional illumination of the face region, an in-plane rotation of the face region, a 3D pose variation of the face region. a degree of smile, a degree of eye-blinking, a degree of eye-winking, a degree of mouth opening, facial blurring, eye-defect, facial shadowing, facial occlusion, facial color, or facial shape, or combinations thereof.

The characteristic may include a directional illumination, and an uneven illumination condition may be determined by applying one or more uneven illumination classifier cascades. A front illumination classifier cascade may also be applied. An illumination condition of a face may be determined within a sub-window based on acceptance by one of the classifier cascades. The digital image may be one of multiple images in a series that include the face, and an uneven illumination condition of the face may be corrected within a different image in the series than the digital image within which the illuminating condition is determined. An uneven illumination classifier cascade may include a top illumination classifier, a bottom illumination classifier, and one or both of right and left illumination classifiers.

A further face detection method is provided that includes acquiring a digital image and extracting a sub-window from said image. Two or more shortened face detection classifier cascades may be applied that are trained to be selectively sensitive to directional facial illumination. A probability may be determined that a face having a certain form of directional facial illumination is present within the sub-window. An extended face detection classifier cascade may be applied that is trained for sensitivity to the certain form of directional face illumination. A final determination is provided that a face exists within the image sub-window. The method may be repeated one or more times for one or more further sub-windows from the image and/or one or more further directional facial illuminations.

The digital image may be one of multiple images in a series that include the face, and an uneven illumination condition of the face may be corrected within a different image in the series than the digital image within which the illuminating condition is determined.

The uneven illumination classifier cascades may include a top illumination classifier, a bottom illumination classifier, and one or both of right and left illumination classifiers. A front illumination classifier cascade may also be applied. An illumination condition of a face may be determined within a sub-window based on acceptance by one of the classifier cascades.

A digital image acquisition device is also provided including an optoelectonic system for acquiring a digital image, and a digital memory having stored therein processor-readable code for programming the processor to perform any of the face detection illumination normalization methods described herein.

BRIEF DESCRIPTION OF THE DRAWINGS

FIG. 9A-9B illustrate face detection methods in accordance with certain embodiments.

DETAILED DESCRIPTION

Figure 1:
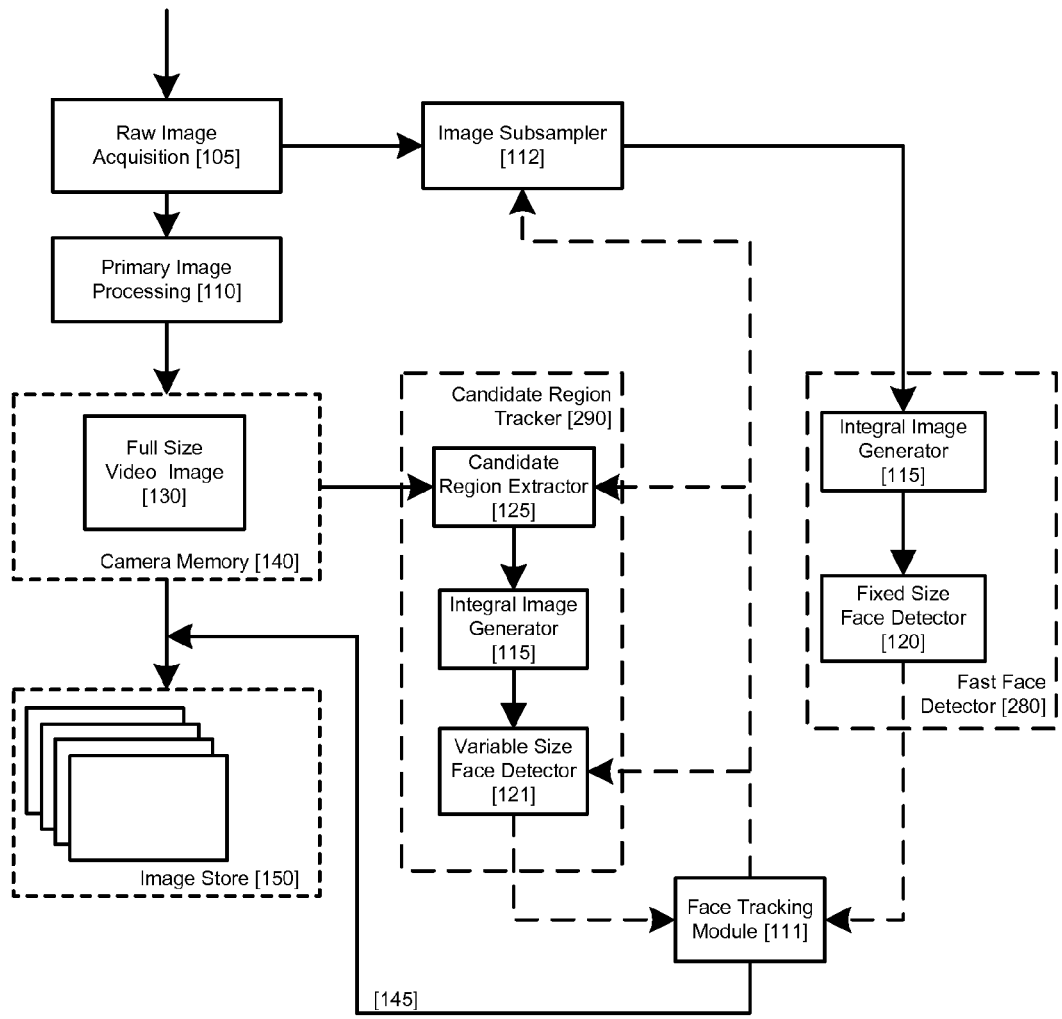
FIG. 1 is a block diagram illustrating the principle components of an image processing apparatus according to a preferred embodiment of the present invention.

FIG. 1 illustrates subsystems of a face detection and tracking system according to certain embodiments. The solid lines indicate the flow of image data; the dashed line indicates control inputs or information outputs (e.g. location(s) of detected faces) from a module. In this example an image processing apparatus can be a digital still camera (DSC), a video camera, a cell phone equipped with an image capturing mechanism or a hand held computer equipped with an internal or external camera.

A digital image is acquired in raw format from an image sensor (CCD or CMOS) [105] and an image subsampler [112] generates a smaller copy of the main image. A digital camera may contain dedicated hardware subsystems to perform image subsampling, for example, to provide preview images to a camera display and/or camera processing components. The subsampled image may be provided in bitmap format (RGB or YCC). In the meantime, the normal image acquisition chain performs post-processing on the raw image [110] which may include some luminance and color balancing. In certain digital imaging systems, subsampling may occur after post-processing, or after certain post-processing filters are applied, but before the entire post-processing filter chain is completed.

The subsampled image is next passed to an integral image generator [115] which creates an integral image from the subsampled image. This integral image is next passed to a fixed size face detector [120]. The face detector is applied to the full integral image, but as this is an integral image of a subsampled copy of the main image, the processing required by the face detector may be proportionately reduced. If the subsample is ¼ of the main image, then this implies that the processing time is only 25% of that for the full image.

This approach is particularly amenable to hardware embodiments where the subsampled image memory space can be scanned by a fixed size DMA window and digital logic to implement a Haar-feature classifier chain can be applied to this DMA window. However, certain embodiment may use one or more different sizes of classifier or several sizes of classifier (e.g., in a software embodiment), or multiple fixed-size classifiers may be used (e.g., in a hardware embodiment). An advantage is that a smaller integral image is calculated.

After application of the fast face detector [280], newly detected candidate face regions [141] may be passed onto a face tracking module [111] when it is desired to use face tracking, where one or more face regions confirmed from previous analysis [145] may be merged with the new candidate face regions prior to being provided [142] to a face tracker [290].

The face tracker [290] provides a set of confirmed candidate regions [143] back to the tracking module [111]. Additional image processing filters are applied by the tracking module [111] to confirm either that these confirmed regions [143] are face regions or to maintain regions as candidates if they have not been confirmed as such by the face tracker [290]. A final set of face regions [145] can be output by the module [111] for use elsewhere in the camera or to be stored within or in association with an acquired image for later processing either within the camera or offline; as well as to be used in the next iteration of face tracking.

After the main image acquisition chain is completed a full-size copy of the main image [130] will normally reside in the system memory [140] of the image acquisition system. This may be accessed by a candidate region extractor [125] component of the face tracker [290] which selects image patches based on candidate face region data [142] obtained from the face tracking module [111]. These image patches for each candidate region are passed to an integral image generator [115] which passes the resulting integral images to a variable-sized detector [121], as one possible example a VJ detector, which then applies a classifier chain, preferably at least a 32 classifier chain, but fewer than 32 are used in some embodiments, to the integral image for each candidate region across a range of different scales.

The range of scales [144] employed by the face detector [121] is determined and supplied by the face tracking module [111] and is based partly on statistical information relating to the history of the current candidate face regions [142] and partly on external metadata determined from other subsystems within the image acquisition system.

As an example of the former, if a candidate face region has remained consistently at a particular size for a certain number of acquired image frames then the face detector [121] may be applied at this particular scale and perhaps at one scale higher (i.e. 1.25 time larger) and one scale lower (i.e. 1.25 times lower).

As an example of the latter, if the focus of the image acquisition system has moved to infinity, then the smallest scalings would be applied in the face detector [121]. Normally these scalings would not be employed because they are applied a greater number of times to the candidate face region in order to cover it completely. The candidate face region will have a minimum size beyond which it should not decrease, and this is in order to allow for localized movement of the camera by a user between frames. In some image acquisition systems which contain motion sensors it may be possible to track such localized movements and this information may be employed to further improve the selection of scales and the size of candidate regions.

The candidate region tracker [290] provides a set of confirmed face regions [143] based on full variable size face detection of the image patches to the face tracking module [111]. Clearly, some candidate regions will have been confirmed while others will have been rejected and these can be explicitly returned by the tracker [290] or can be calculated by the tracking module [111] by analyzing the difference between the confirmed regions [143] and the candidate regions [142]. In either case, the face tracking module [111] can then apply alternative tests to candidate regions rejected by the tracker [290] (as explained below) to determine whether these should be maintained as candidate regions [142] for the next cycle of tracking or whether these should indeed be removed from tracking.

Once the set of confirmed candidate regions [145] has been determined by the face tracking module [111], the module [111] communicates with the sub-sampler [112] to determine when the next acquired image is to be sub-sampled and so provided to the detector [280] and also to provide the resolution [146] at which the next acquired image is to be sub-sampled.

It will be seen that where the detector [280] does not run when the next image is acquired, the candidate regions [142] provided to the extractor [125] for the next acquired image will be the regions [145] confirmed by the tracking module [111] from the last acquired image. On the other hand, when the face detector [280] provides a new set of candidate regions [141] to the face tracking module [111], these candidate regions are merged with the previous set of confirmed regions [145] to provide the set of candidate regions [142] to the extractor [125] for the next acquired image.

Figure 2:
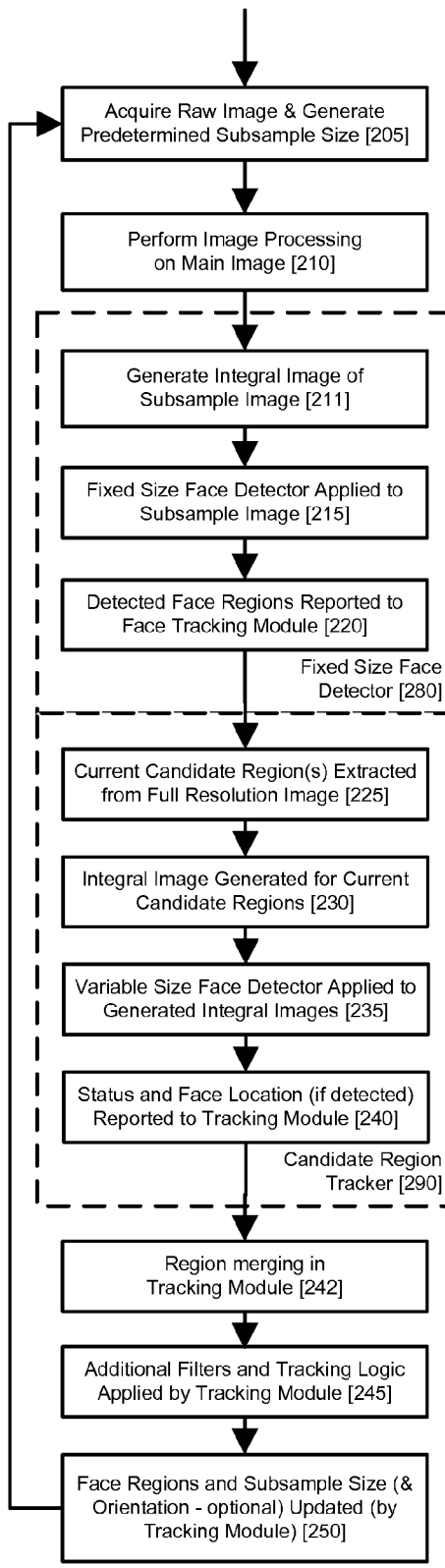
FIG. 2 is a flow diagram illustrating the operation of the image processing apparatus of FIG. 1.

FIG. 2 illustrates an exemplary workflow. The illustrated process is split into (i) a detection/initialization phase which finds new candidate face regions [141] using the fast face detector [280] which operates on a subsampled version of the full image; (ii) a secondary face detection process [290] which operates on extracted image patches for the candidate regions [142], which are determined based on the location of faces in one or more previously acquired image frames and (iii) a main tracking process which computes and stores a statistical history of confirmed face regions [143]. Although the application of the fast face detector [280] is illustrated as occurring prior to the application of the candidate region tracker [290], the order is not critical and the fast detection is not necessarily executed on every frame and in certain circumstances may be spread across multiple frames. Also, face detection may be used for various applications such as face recognition whether or not face tracking is also used.

In step 205, the main image is acquired and in step 210 primary image processing of that main image is performed as described in relation to FIG. 1. The sub-sampled image is generated by the subsampler [112] and an integral image is generated therefrom by the generator [115], step 211 as described previously. The integral image is passed to the fixed size face detector [120] and the fixed size window provides a set of candidate face regions [141] within the integral image to the face tracking module, step 220. The size of these regions is determined by the sub-sampling scale [146] specified by the face tracking module to the sub-sampler and this scale is based on the analysis of the previous sub-sampled/integral images by the detector [280] and patches from previous acquired images by the tracker [290] as well as other inputs such as camera focus and movement.

The set of candidate regions [141] is merged with the existing set of confirmed regions [145] to produce a merged set of candidate regions [142] to be provided for confirmation, step 242. For the candidate regions [142] specified by the face tracking module 111, the candidate region extractor [125] extracts the corresponding full resolution patches from an acquired image, step 225. An integral image is generated for each extracted patch, step 230 and variable-sized face detection is applied by the face detector 121 to each such integral image patch, for example, a full Viola-Jones analysis. These results [143] are in turn fed back to the face-tracking module [111], step 240.

The tracking module [111] processes these regions [143] further before a set of confirmed regions [145] is output. In this regard, additional filters can be applied by the module 111 either for regions [143] confirmed by the tracker [290] or for retaining candidate regions [142] which may not have been confirmed by the tracker 290 or picked up by the detector [280], step 245.

For example, if a face region had been tracked over a sequence of acquired images and then lost, a skin prototype could be applied to the region by the module [111] to check if a subject facing the camera had just turned away. If so, this candidate region could be maintained for checking in the next acquired image to see if the subject turns back to face the camera. Depending on the sizes of the confirmed regions being maintained at any given time and the history of their sizes, e.g. whether they are getting bigger or smaller, the module 111 determines the scale [146] for sub-sampling the next acquired image to be analyzed by the detector [280] and provides this to the sub-sampler [112], step 250.

The fast face detector [280] need not run on every acquired image. So for example, where only a single source of sub-sampled images is available, if a camera acquires 60 frames per second, 15-25 sub-sampled frames per second (fps) may be required to be provided to the camera display for user previewing. These images are sub-sampled at the same scale and at a high enough resolution for the display. Some or all of the remaining 35-45 fps can be sampled at the scale determined by the tracking module [111] for face detection and tracking purposes.

The decision on the periodicity in which images are being selected from the stream may be based on a fixed number or alternatively be a run-time variable. In such cases, the decision on the next sampled image may be determined on the processing time it took for the previous image, in order to maintain synchronicity between the captured real-time stream and the face tracking processing. Thus in a complex image environment the sample rate may decrease.

Alternatively, the decision on the next sample may also be performed based on processing of the content of selected images. If there is no significant change in the image stream, the full face tracking process might not be performed. In such cases, although the sampling rate may be constant, the images will undergo a simple image comparison and only if it is decided that there is justifiable differences, will the face tracking algorithms be launched.

It will also be noted that the face detector [280] may run at regular or irregular intervals. So for example, if the camera focus is changed significantly, then the face detector may be run more frequently and particularly with differing scales of sub-sampled image to try to detecting faces which should be changing in size. Alternatively, where focus is changing rapidly, the detector [280] could be skipped for intervening frames, until focus has stabilised. However, it is generally only when focus goes to infinity that the highest resolution integral image is produced by the generator [115].

In this latter case, the detector in some embodiments may not be able to cover the entire area of the acquired, sub-sampled, image in a single frame. Accordingly the detector may be applied across only a portion of the acquired, sub-sampled, image on a first frame, and across the remaining portion(s) of the image on subsequent acquired image frames. In one embodiment, the detector is applied to the outer regions of the acquired image on a first acquired image frame in order to catch small faces entering the image from its periphery, and on subsequent frames to more central regions of the image.

An alternative way of limiting the areas of an image to which the face detector 120 is to be applied comprises identifying areas of the image which include skin tones. U.S. Pat. No. 6,661,907, hereby incorporated by reference, discloses one such technique for detecting skin tones and subsequently only applying face detection in regions having a predominant skin color.

In one embodiment, skin segmentation 190 is preferably applied to the sub-sampled version of the acquired image. If the resolution of the sub-sampled version is not sufficient, then a previous image stored at image store 150 or a next sub-sampled image are preferably used when the two images are not too different in content from the current acquired image. Alternatively, skin segmentation 190 can be applied to the full size video image 130.

In any case, regions containing skin tones are identified by bounding rectangles and these bounding rectangles are provided to the integral image generator 115 which produces integral image patches corresponding to the rectangles in a manner similar to the tracker integral image generator 115.

Not alone does this approach reduce the processing overhead associated with producing the integral image and running face detection, but in certain embodiments, it also allows the face detector 120 to apply more relaxed face detection to the bounding rectangles, as there is a higher chance that these skin-tone regions do in fact contain a face. So for a VJ detector 120, a shorter classifier chain can be employed to more effectively provide similar quality results to running face detection over the whole image with longer VJ classifiers required to positively detect a face.

Further improvements to face detection are also possible. For example, it has been found that face detection is significantly dependent on illumination conditions and so small variations in illumination can cause face detection to fail, causing somewhat unstable detection behavior.

In one embodiment, confirmed face regions 145 are used to identify regions of a subsequently acquired subsampled image on which luminance correction should be performed to bring the regions of interest of the image to be analyzed to the desired parameters. One example of such correction is to improve the luminance contrast within the regions of the subsampled image defined by the confirmed face regions 145.

Contrast enhancement may be used to increase the local contrast of an image, especially when the usable data of the image is represented by close contrast values. Through this adjustment, the intensities for pixels of a region when represented on a histogram which would otherwise be closely distributed can be better distributed. This allows for areas of lower local contrast to gain a higher contrast without affecting the global contrast. Histogram equalization accomplishes this by effectively spreading out the most frequent intensity values.

The method is useful in images with backgrounds and foregrounds that are both bright or both dark. In particular, the method can lead to better detail in photographs that are over or under-exposed. Alternatively, this luminance correction could be included in the computation of an "adjusted" integral image in the generators 115.

In another improvement, when face detection is being used, the camera application is set to dynamically modify the exposure from the computed default to a higher values (from frame to frame, slightly overexposing the scene) until the face detection provides a lock onto a face. In a separate embodiment, the face detector 120 will be applied to the regions that are substantively different between images. Note that prior to comparing two sampled images for change in content, a stage of registration between the images may be needed to remove the variability of changes in camera, caused by camera movement such as zoom, pan and tilt.

It is possible to obtain zoom information from camera firmware and it is also possible using software techniques which analyze images in camera memory 140 or image store 150 to determine the degree of pan or tilt of the camera from one image to another.

In one embodiment, the acquisition device is provided with a motion sensor 180, as illustrated in FIG. 1, to determine the degree and direction of pan from one image to another so avoiding the processing requirement of determining camera movement in software. Motion sensors may be incorporated in digital cameras, e.g., based on accelerometers, but optionally based on gyroscopic principals, primarily for the purposes of warning or compensating for hand shake during main image capture. In this context, U.S. Pat. No. 4,448,510, Murakoshi, hereby incorporated by reference, discloses such a system for a conventional camera, or U.S. Pat. No. 6,747,690, Molgaard, hereby incorporated by reference, discloses accelerometer sensors applied within a modern digital camera.

Where a motion sensor is incorporated in a camera, it may be optimized for small movements around the optical axis. The accelerometer may incorporate a sensing module which generates a signal based on the acceleration experienced and an amplifier module which determines the range of accelerations which can effectively be measured. The accelerometers may allow software control of the amplifier stage which allows the sensitivity to be adjusted.

The motion sensor 180 could equally be implemented with MEMS sensors of the sort which will be incorporated in next generation consumer cameras and camera-phones. In any case, when the camera is operable in face tracking mode, i.e. constant video acquisition as distinct from acquiring a main image, shake compensation might not be used because image quality is lower. This provides the opportunity to configure the motion sensor 180, to sense large movements, by setting the motion sensor amplifier module to low gain. The size and direction of movement detected by the sensor 180 is provided to the face tracker 111. The approximate size of faces being tracked is already known and this enables an estimate of the distance of each face from the camera. Accordingly, knowing the approximate size of the large movement from the sensor 180 allows the approximate displacement of each candidate face region to be determined, even if they are at differing distances from the camera.

Thus, when a large movement is detected, the face tracker 111 shifts the location of candidate regions as a function of the direction and size of the movement. Alternatively, the size of the region over which the tracking algorithms are applied may also be enlarged (and, if necessary, the sophistication of the tracker may be decreased to compensate for scanning a larger image area) as a function of the direction and size of the movement.

When the camera is actuated to capture a main image, or when it exits face tracking mode for any other reason, the amplifier gain of the motion sensor 180 is returned to normal, allowing the main image acquisition chain 105,110 for full-sized images to employ normal shake compensation algorithms based on information from the motion sensor 180. In alternative embodiments, sub-sampled preview images for the camera display can be fed through a separate pipe than the images being fed to and supplied from the image sub-sampler [112] and so every acquired image and its sub-sampled copies can be available both to the detector [280] as well as for camera display.

In addition to periodically acquiring samples from a video stream, the process may also be applied to a single still image acquired by a digital camera. In this case, the stream for the face tracking comprises a stream of preview images and the final image in the series is the full resolution acquired image. In such a case, the face tracking information can be verified for the final image in a similar fashion to that illustrated in FIG. 2. In addition, the information such as coordinates or mask of the face may be stored with the final image. Such data for example may fit as an entry in the saved image header, for future post processing, whether in the acquisition device or at a later stage by an external device.

Figure 3A:
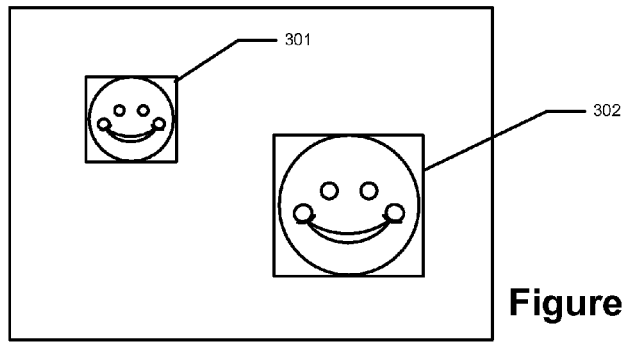
FIGS. 3A-3D shows examples of images processed by the apparatus of the preferred embodiment.

FIGS. 3A-3D illustrate operations of certain embodiments through worked examples. FIG. 3A illustrates the result at the end of a detection & tracking cycle on a frame of video or a still within a series of stills, and two confirmed face regions [301, 302] of different scales are shown. In this embodiment, for pragmatic reasons, each face region has a rectangular bounding box, as it is easier to make computations on rectangular regions. This information is recorded and output as [145] by the tracking module [111] of FIG. 1. Based on the history of the face regions [301,302], the tracking module [111] may decide to run fast face tracking with a classifier window of the size of face region [301] with an integral image being provided and analyzed accordingly.

Figure 3B:
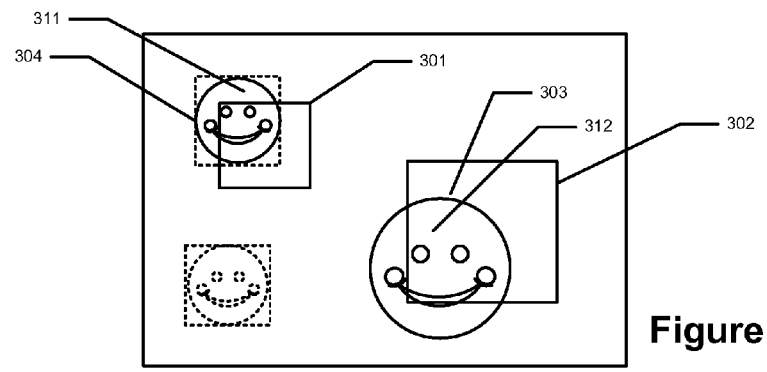

FIG. 3B illustrates the situation after the next frame in a video sequence is captured and the fast face detector has been applied to the new image. Both faces have moved [311, 312] and are shown relative to previous face regions [301, 302]. A third face region [303] has appeared and has been detected by the fast face detector [303]. In addition the fast face detector has found the smaller of the two previously confirmed faces [304] because it is at the correct scale for the fast face detector. Regions [303] and [304] are supplied as candidate regions [141] to the tracking module [111]. The tracking module merges this new candidate region information [141], with the previous confirmed region information [145] comprising regions [301] [302] to provide a set of candidate regions comprising regions [303], [304] and [302] to the candidate region extractor [290]. The tracking module [111] knows that the region [302] has not been picked up by the detector [280]. This may be because the face has disappeared, remains at a size that could not have been detected by the detector [280] or has changed size to a size that could not have been detected by the detector [280]. Thus, for this region, the module [111] will specify a large patch [305].

Figure 3C:
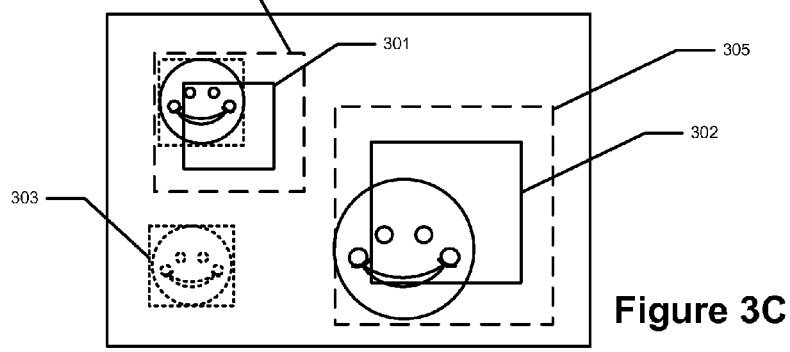

The large patch 305 may be as illustrated at FIG. 3C around the region [302] to be checked by the tracker [290]. Only the region [303] bounding the newly detected face candidate needs to be checked by the tracker [290], whereas because the face [301] is moving a relatively large patch [306] surrounding this region is specified to the tracker [290].

FIG. 3C illustrates the situation after the candidate region extractor operates upon the image, candidate regions [306, 305] around both of the confirmed face regions [301, 302] from the previous video frame as well as new region [303] are extracted from the full resolution image [130]. The size of these candidate regions has been calculated by the face tracking module [111] based partly on partly on statistical information relating to the history of the current face candidate and partly on external metadata determined from other sub-systems within the image acquisition system. These extracted candidate regions are now passed on to the variable sized face detector [121] which applies a VJ face detector to the candidate region over a range of scales. The locations of one or more confirmed face regions, if any, are then passed back to the face tracking module [111].

Figure 3D:
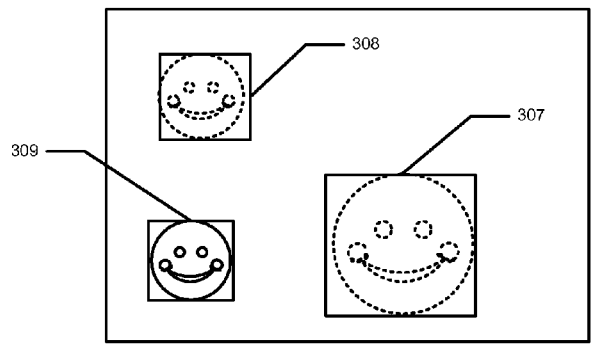

FIG. 3D illustrates the situation after the face tracking module [111] has merged the results from both the fast face detector [280] and the face tracker [290] and applied various confirmation filters to the confirmed face regions. Three confirmed face regions have been detected [307, 308, 309] within the patches [305, 306, 303]. The largest region [307] was known but had moved from the previous video frame and relevant data is added to the history of that face region. The other previously known region [308] which had moved was also detected by the fast face detector which serves as a double-confirmation and these data are added to its history. Finally, a new face region [303] was detected and confirmed and a new face region history must be initiated for this newly detected face. These three face regions are used to provide a set of confirmed face regions [145] for the next cycle.

There are many possible applications for the regions 145 supplied by the face tracking module. For example, the bounding boxes for each of the regions [145] can be superimposed on the camera display to indicate that the camera is automatically tracking detected face(s) in a scene. This can be used for improving various pre-capture parameters. One example is exposure, ensuring that the faces are well exposed. Another example is auto-focusing, by ensuring that focus is set on a detected face or indeed to adjust other capture settings for the optimal representation of the face in an image.

The corrections may be done as part of the pre-processing adjustments. The location of the face tracking may also be used for post processing and in particular selective post processing where the regions with the faces may be enhanced. Such examples include sharpening, enhancing saturation, brightening or increasing local contrast. The preprocessing using the location of faces may also be used on the regions without the face to reduce their visual importance, for example through selective blurring, de-saturation, or darkening.

Where several face regions are being tracked, then the longest lived or largest face can be used for focusing and can be highlighted as such. Also, the regions [145] can be used to limit the areas on which for example red-eye processing is performed when required. Other post-processing which can be used in conjunction with the light-weight face detection described above is face recognition. In particular, such an approach can be useful when combined with more robust face detection and recognition either running on the same or an off-line device that has sufficient resources to run more resource consuming algorithms.

In this case, the face tracking module [111] reports the location of any confirmed face regions [145] to the in-camera firmware, preferably together with a confidence factor. When the confidence factor is sufficiently high for a region, indicating that at least one face is in fact present in an image frame, the camera firmware runs a light-weight face recognition algorithm [160] at the location of the face, for example a DCT-based algorithm. The face recognition algorithm [160] uses a database [161] preferably stored on the camera comprising personal identifiers and their associated face parameters.

In operation, the module [160] collects identifiers over a series of frames. When the identifiers of a detected face tracked over a number of preview frames are predominantly of one particular person, that person is deemed by the recognition module to be present in the image. One or both of the identifier of the person and the last known location of the face are stored either in the image (in a header) or in a separate file stored on the camera storage [150]. This storing of the person's ID can occur even when the recognition module [160] has failed for the immediately previous number of frames but for which a face region was still detected and tracked by the module [111].

When an image is copied from camera storage to a display or permanent storage device such as a PC (not shown), the person ID's are copied along with the images. Such devices are generally more capable of running a more robust face detection and recognition algorithm and then combining the results with the recognition results from the camera, giving more weight to recognition results from the robust face recognition (if any). The combined identification results are presented to the user, or if identification was not possible, the user is asked to enter the name of the person that was found. When the user rejects an identification or a new name is entered, the PC retrains its face print database and downloads the appropriate changes to the capture device for storage in the light-weight database [161]. When multiple confirmed face regions [145] are detected, the recognition module [160] can detect and recognize multiple persons in the image.

It is possible to introduce a mode in the camera that does not take a shot until persons are recognized or until it is clear that persons are not present in the face print database, or alternatively displays an appropriate indicator when the persons have been recognized. This allows reliable identification of persons in the image.

This feature solves the problem where algorithms using a single image for face detection and recognition may have lower probability of performing correctly. In one example, for recognition, if the face is not aligned within certain strict limits it is not possible to accurately recognize a person. This method uses a series of preview frames for this purpose as it can be expected that a reliable face recognition can be done when many more variations of slightly different samples are available.

Further improvements to the efficiency of systems described herein are possible. For example, a face detection algorithm may employ methods or use classifiers to detect faces in a picture at different orientations: 0, 90, 180 and 270 degrees. According to a further embodiment, the camera is equipped with an orientation sensor. This can comprise a hardware sensor for determining whether the camera is being held upright, inverted or tilted clockwise or anti-clockwise. Alternatively, the orientation sensor can comprise an image analysis module connected either to the image acquisition hardware 105, 110 or camera memory 140 or image store 150, each as illustrated in FIG. 1, for quickly determining whether images are being acquired in portrait or landscape mode and whether the camera is tilted clockwise or anti-clockwise.

Once this determination is made, the camera orientation can be fed to one or both of the face detectors 120, 121. The detectors need then only apply face detection according to the likely orientation of faces in an image acquired with the determined camera orientation. This feature significantly reduces face detection processing overhead, for example, by avoiding the employing of classifiers which are unlikely to detect faces or increase its accuracy by running classifiers more likely to detects faces in a given orientation more often.

According to another embodiment, there is provided a method for image recognition in a collection of digital images that includes training image classifiers and retrieving a sub-set of images from the collection. The training of the image classifiers preferably includes one, more than one or all of the following: For each image in the collection, any regions within the image that correspond to a face are identified. For each face region and any associated peripheral region, feature vectors are determined for each of the image classifiers. The feature vectors are stored in association with data relating to the associated face region.

The retrieval of the sub-set of images from the collection preferably includes one, more than one or all of the following: At least one reference region including a face to be recognized is/are selected from an image. At least one classifier on which said retrieval is to be based is/are selected from the image classifiers. A respective feature vector for each selected classifier is determined for the reference region. The sub-set of images is retrieved from within the image collection in accordance with the distance between the feature vectors determined for the reference region and the feature vectors for face regions of the image collection.

A component for image recognition in a collection of digital images is further provided including a training module for training image classifiers and a retrieval module for retrieving a sub-set of images from the collection.

The training module is preferably configured according to one, more than one or all of the following: For each image in the collection, any regions are identified that correspond to a face in the image. For each face region and any associated peripheral region, feature vectors are determined for each of the image classifiers. The feature vectors are stored in association with data relating to the associated face region.

The retrieval module is preferably configured according to one, more than one or all of the following: At least one reference region including a face to be recognized is/are selected from an image. At least one image classifier is/are selected on which the retrieval is to be based. A respective feature vector is determined for each selected classifier of the reference region. A sub-set of images is selected from within the image collection in accordance with the distance between the feature vectors determined for the reference region and the feature vectors for face regions of the image collection.

In a further aspect there is provided a corresponding component for image recognition. In this embodiment, the training process cycles automatically through each image in an image collection, employing a face detector to determine the location of face regions within an image. It then extracts and normalizes these regions and associated non-face peripheral regions which are indicative of, for example, the hair, clothing and/or pose of the person associated with the determined face region(s). Initial training data is used to determine a basis vector set for each face classifier.

A basis vector set comprises a selected set of attributes and reference values for these attributes for a particular classifier. For example, for a DCT classifier, a basis vector could comprise a selected set of frequencies by which selected image regions are best characterized for future matching and/or discrimination and a reference value for each frequency. For other classifiers, the reference value can simply be the origin (zero value) within a vector space.

Next, for each determined, extracted and normalized face region, at least one feature vector is generated for at least one face-region based classifier and where an associated non-face region is available, at least one further feature vector is generated for a respective non-face region based classifier. A feature vector can be thought of as an identified region's coordinates within the basis vector space relative to the reference value.

These data are then associated with the relevant image and face/peripheral region and are stored for future reference. In this embodiment, image retrieval may either employ a user selected face region or may automatically determine and select face regions in a newly acquired image for comparing with other face regions within the selected image collection. Once at least one face region has been selected, the retrieval process determines (or if the image was previously "trained", loads) feature vectors associated with at least one face-based classifier and at least one non-face based classifier. A comparison between the selected face region and all other face regions in the current image collection will next yield a set of distance measures for each classifier. Further, while calculating this set of distance measures, mean and variance values associated with the statistical distribution of the distance measures for each classifier are calculated. Finally these distance measures are preferably normalized using the mean and variance data for each classifier and are summed to provide a combined distance measure which is used to generate a final ranked similarity list.

In another embodiment, the classifiers include a combination of wavelet domain PCA (principle component analysis) classifier and 2D-DCT (discrete cosine transform) classifier for recognizing face regions. These classifiers do not require a training stage for each new image that is added to an image collection. For example, techniques such as ICA (independent component analysis) or the Fisher Face technique which employs LDA (linear discriminant analysis) are well known face recognition techniques which adjust the basis vectors during a training stage to cluster similar images and optimize the separation of these clusters.

The combination of these classifiers is robust to different changes in face poses, illumination, face expression and image quality and focus (sharpness). PCA (principle component analysis) is also known as the eigenface method. A summary of conventional techniques that utilize this method is found in *Eigenfaces for Recognition*, Journal of Cognitive Neuroscience, 3(1), 1991 to Turk et al., which is hereby incorporated by reference. This method is sensitive to facial expression, small degrees of rotation and different illuminations. In the preferred embodiment, high frequency components from the image that are responsible for slight changes in face appearance are filtered. Features obtained from low pass filtered sub-bands from the wavelet decomposition are significantly more robust to facial expression, small degrees of rotation and different illuminations than conventional PCA.

In general, the steps involved in implementing the PCA/Wavelet technique include: (i) the extracted, normalized face region is transformed into gray scale; (ii) wavelet decomposition in applied using Daubechie wavelets; (iii) histogram equalization is performed on the grayscale LL sub-band representation; next, (iv) the mean LL sub-band is calculated and subtracted from all faces and (v) the 1st level LL sub-band is used for calculating the covariance matrix and the principal components (eigenvectors). The resulting eigenvectors (basis vector set) and the mean face are stored in a file after training so they can be used in determining the principal components for the feature vectors for detected face regions. Alternative embodiments may be discerned from the discussion in H. Lai, P. C. Yuen, and G. C. Feng, "Face recognition using holistic Fourier invariant features" Pattern Recognition, vol. 34, pp. 95-109, 2001, which is hereby incorporated by reference.

In the 2D Discrete Cosine Transform classifier, the spectrum for the DCT transform of the face region can be further processed to obtain more robustness (see also, *Application of the DCT Energy Histogram for Face Recognition*, in Proceedings of the 2nd International Conference on Information Technology for Application (ICITA 2004) to Tjahyadi et al., hereby incorporated by reference).

The steps involved in this technique are generally as follows: (i) the resized face is transformed to an indexed image using a 256 color gif colormap; (ii) the 2D DCT transform is applied; (iii) the resulting spectrum is used for classification; (iv) for comparing similarity between DCT spectra the Euclidian distance was used. Examples of non-face based classifiers are based on color histogram, color moment, colour correlogram, banded colour correlogram, and wavelet texture analysis techniques. An implementaton of color histogram is described in "CBIR method based on color-spatial feature," *IEEE Region 10th Ann. Int. Conf.* 1999 (TEN-CON'99, Cheju, Korea, 1999). Use of the colour histogram is, however, typically restricted to classification based on the color information contained within one or more sub-regions of the image.

Color moment may be used to avoid the quantization effects which are found when using the color histogram as a classifier (see also "Similarity of color images," *SPIE Proc.* pp. 2420 (1995) to Stricker et al, hereby incorporated by reference). The first three moments (mean, standard deviation and skews) are extracted from the three color channels and therefore form a 9-dimensional feature vector.

The color auto-correlogram (see, U.S. Pat. No. 6,246,790 to Huang et al, hereby incorporated by reference) provides an image analysis technique that is based on a three-dimensional table indexed by color and distance between pixels which expresses how the spatial correlation of color changes with distance in a stored image. The color correlogram may be used to distinguish an image from other images in a database. It is effective in combining the color and texture features together in a single classifier (see also, "Image indexing using color correlograms," In *IEEE Conf. Computer Vision and Pattern Recognition*, PP. 762 et seq (1997) to Huang et al., hereby incorporated by reference).

In certain embodiments, the color correlogram is implemented by transforming the image from RGB color space, and reducing the image colour map using dithering techniques based on minimum variance quantization. Variations and alternative embodiments may be discerned from *Variance based color image quantization for frame buffer display*," Color Res. Applicat., vol. 15, no. 1, pp. 52-58, 1990 to by Wan et al., which is hereby incorporated by reference. Reduced colour maps of 16, 64, 256 colors are achievable. For 16 colors the VGA colormap may be used and for 64 and 256 colors, a gif colormap may be used. A maximum distance set D=1; 3; 5; 7 may be used for computing auto-correlogram to build a N×D dimension feature vector where N is the number of colors and D is the maximum distance.

The color autocorrelogram and banded correlogram may be calculated using a fast algorithm (see, e.g., "Image Indexing Using Color Correlograms" from the Proceedings of the 1997 Conference on Computer Vision and Pattern Recognition (CVPR '97) to Huang et al., hereby incorporated by reference). Wavelet texture analysis techniques (see, e.g., "Texture analysis and classification with tree-structured wavelet transform," *IEEE Trans. Image Processing* 2(4), 429 (1993) to Chang et al., hereby incorporated by reference) may also be advantageously used. In order to extract the wavelet based texture, the original image is decomposed into 10 decorrelated sub-bands through 3-level wavelet transform. In each sub-band, the standard deviation of the wavelet coefficients is extracted, resulting in a 10-dimensional feature vector.

Figure 4:
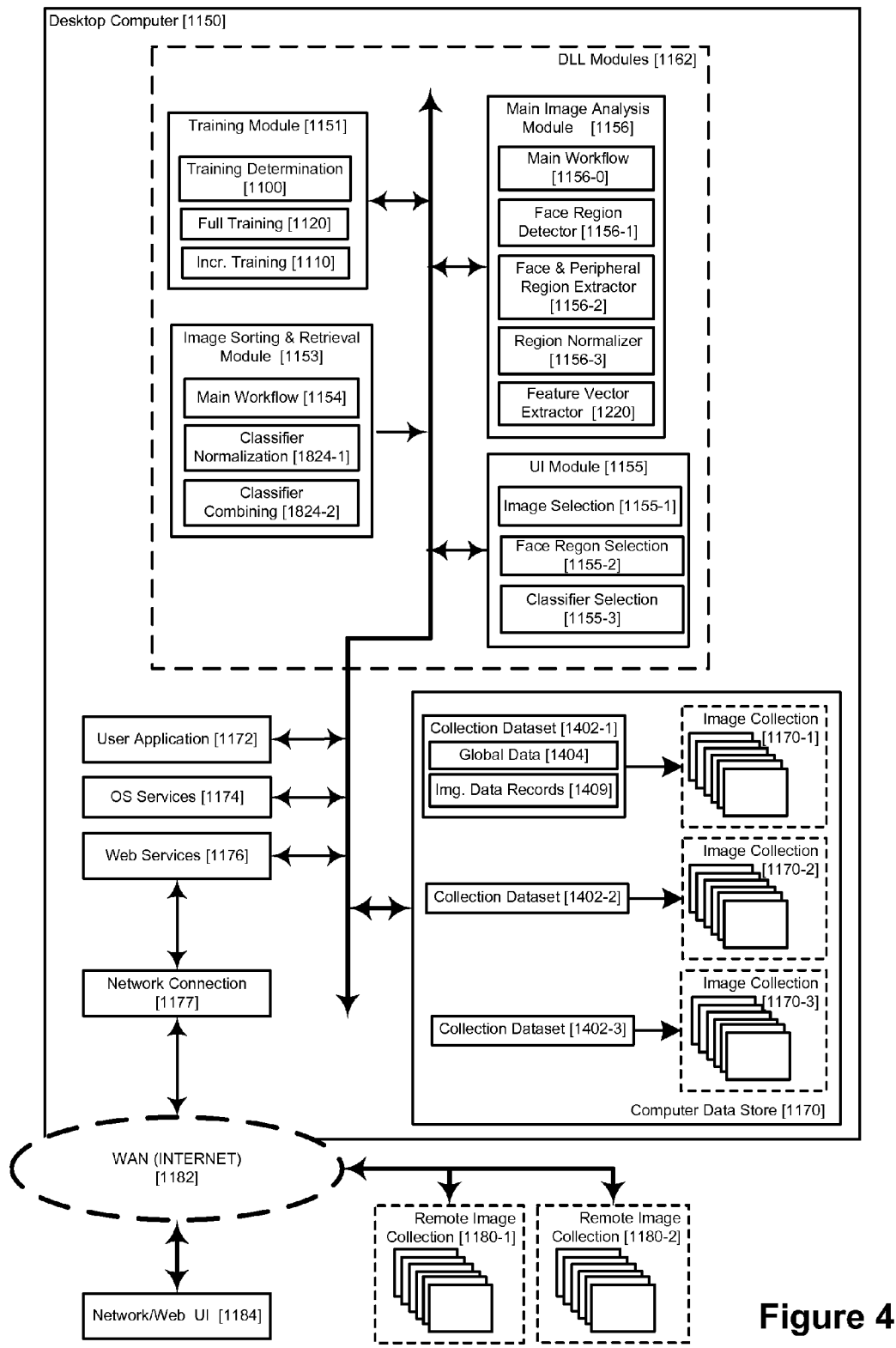
FIG. 4 is a block diagram of an image processing system in accordance with certain embodiments.
Figure 5:
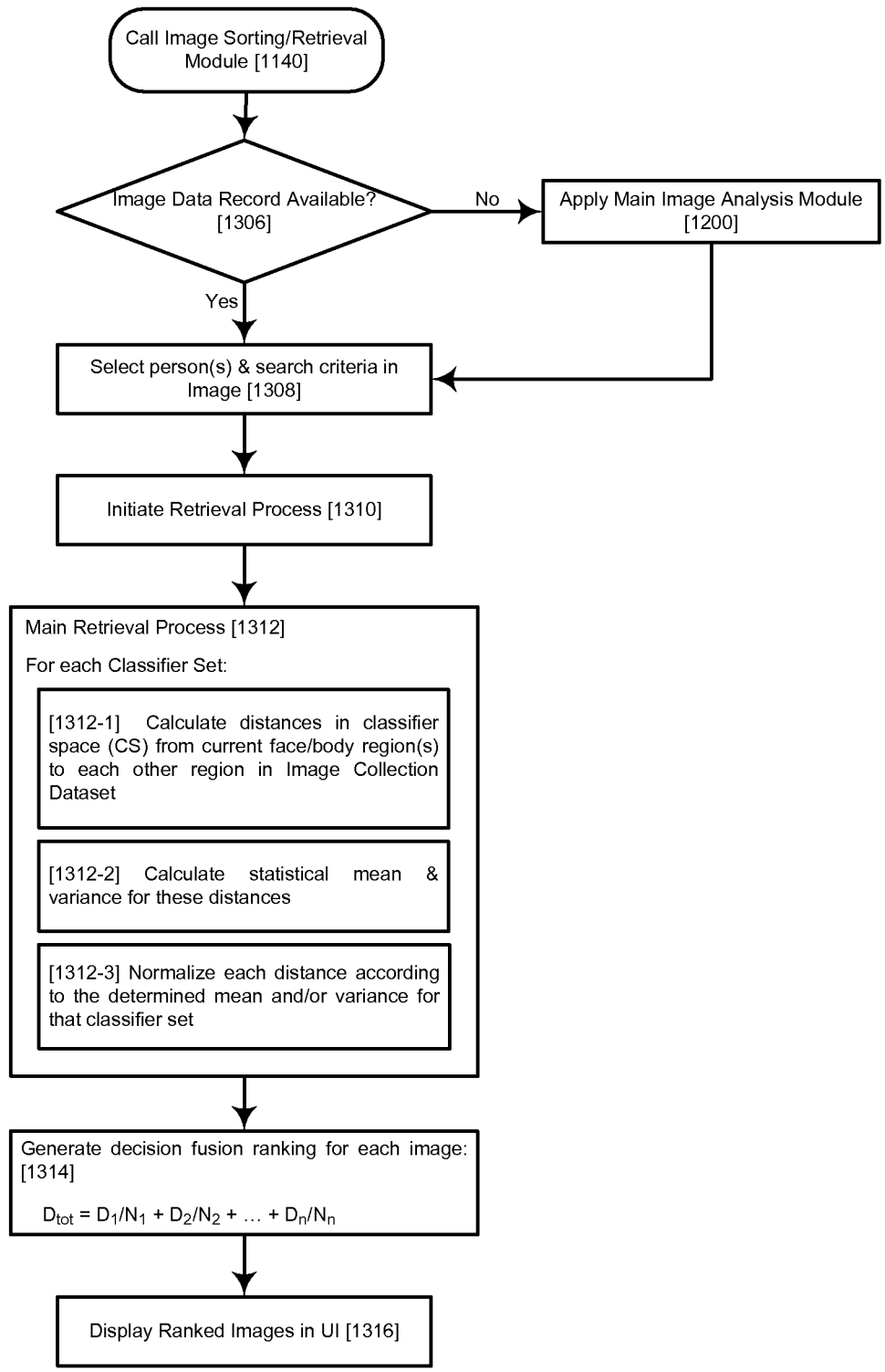
FIG. 5 illustrates a main image sorting/retrieval workflow in accordance with certain embodiments.
Figure 6A:
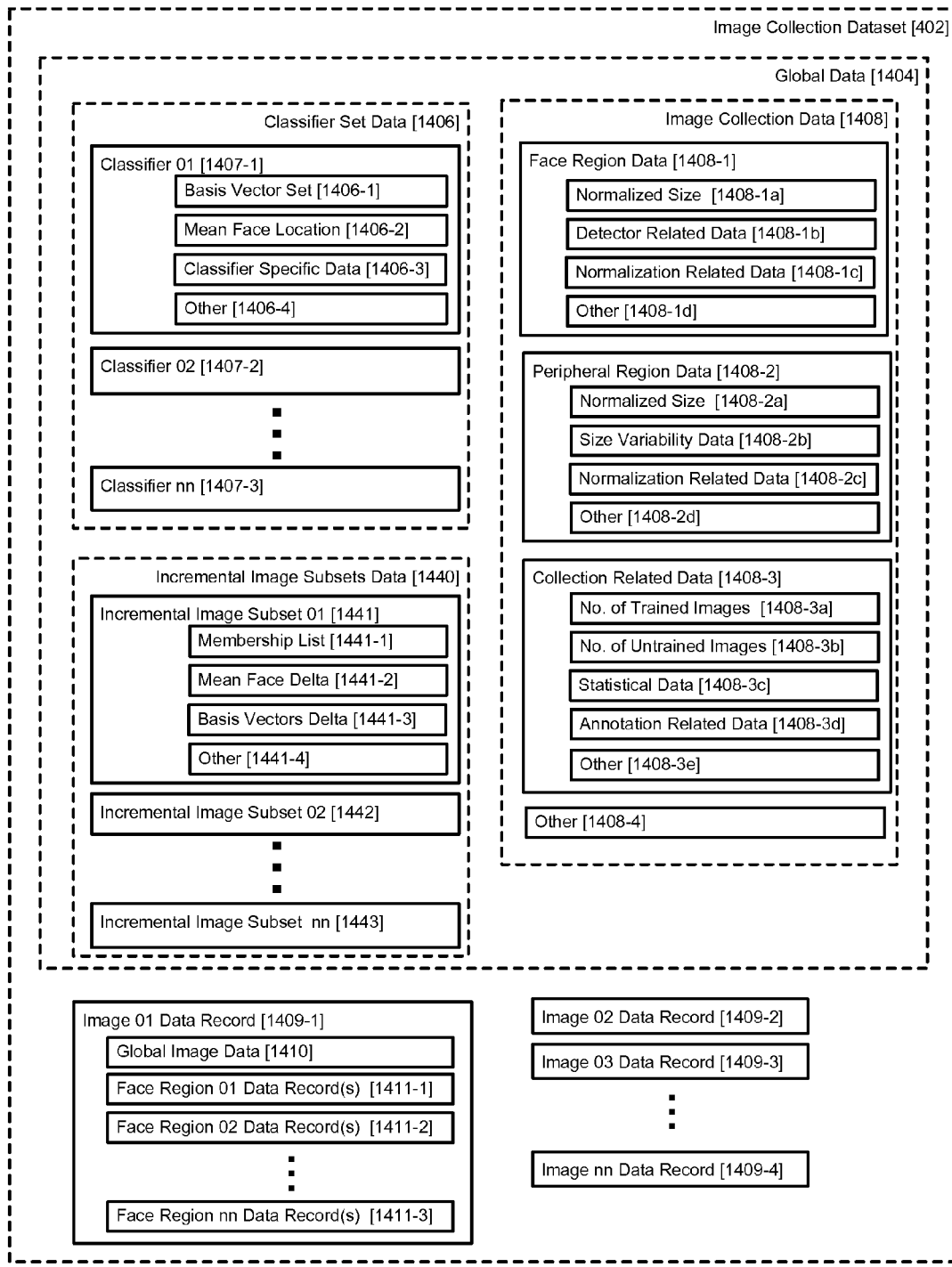
FIG. 6A illustrates an exemplary data storage structure for an image collection data set.
Figure 6B:
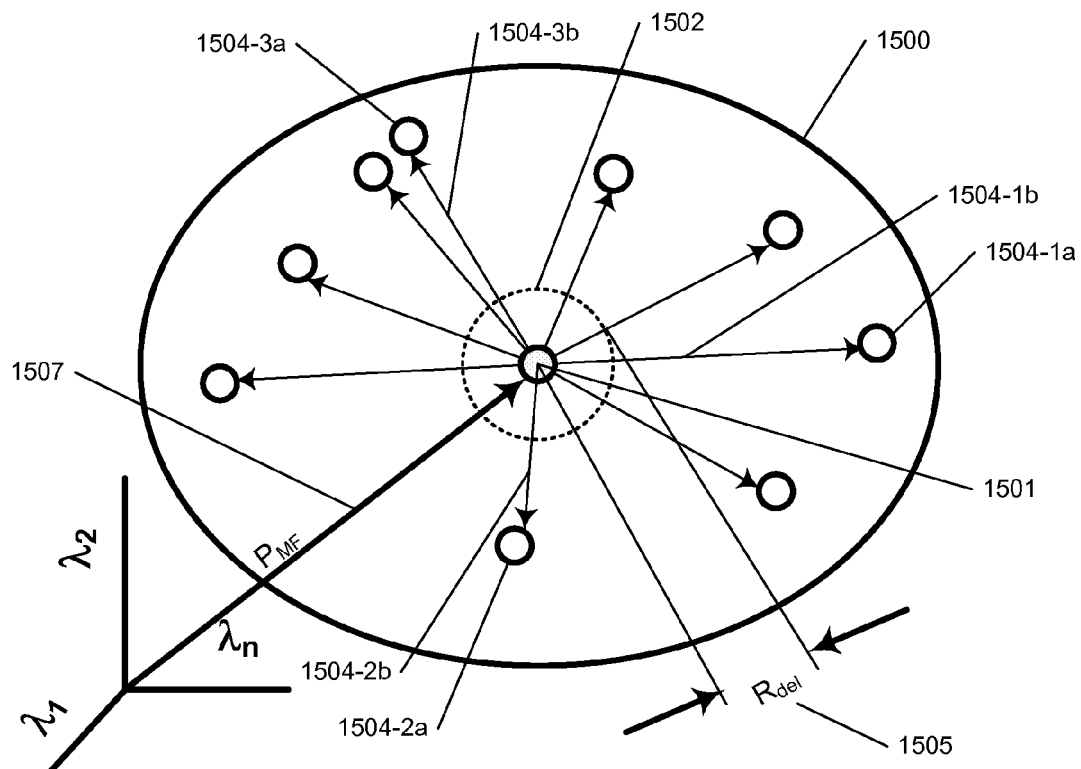
FIGS. 6B and 6D illustrate aspects of an image classifier where the feature vectors for individual patterns can be determined relative to an "averaged" pattern (mean face) and where feature vectors for individual patterns are determined in absolute terms (colour correlogram), respectively.
Figure 6C:
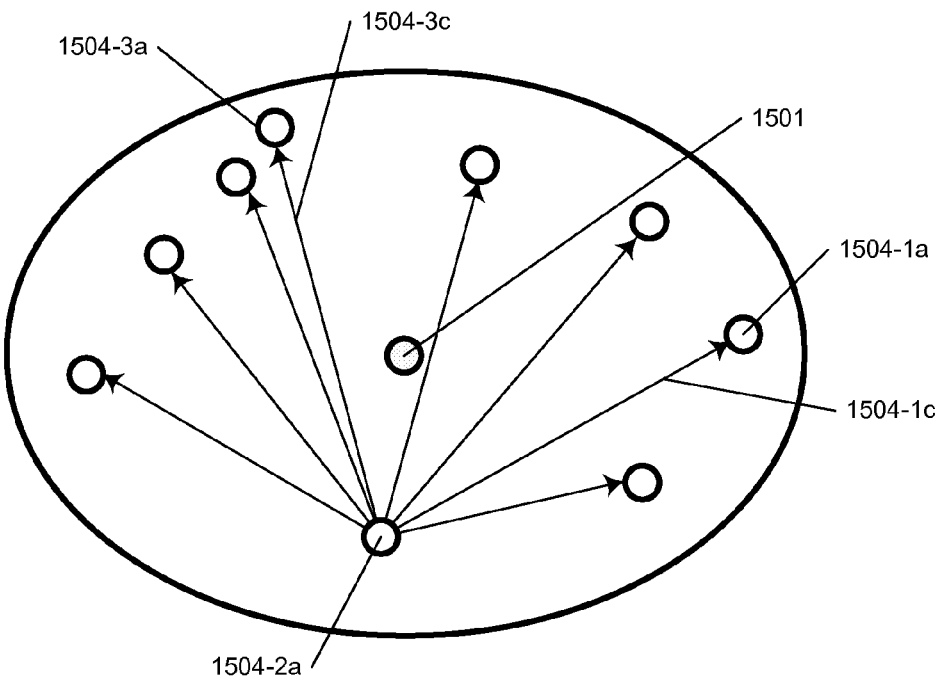
FIGS. 6C and 6E illustrate the calculation of respective sets of similarity measure distances from a selected classifier pattern to all other classifier patterns within images of the Image Collection.
Figure 6D:
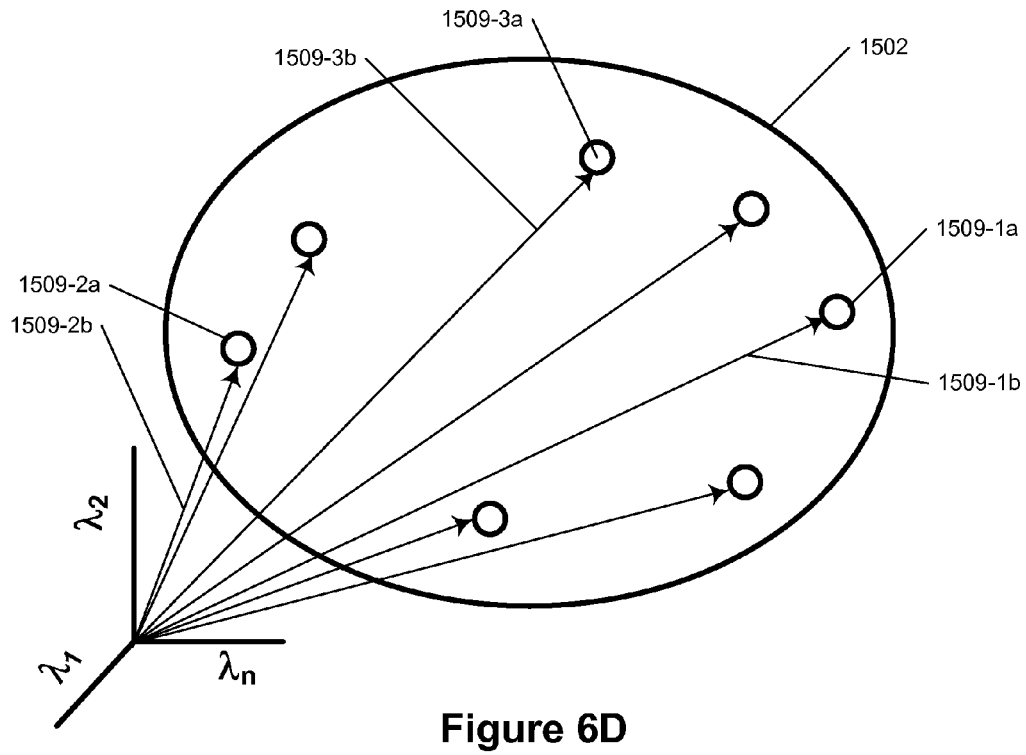
Figure 6E:
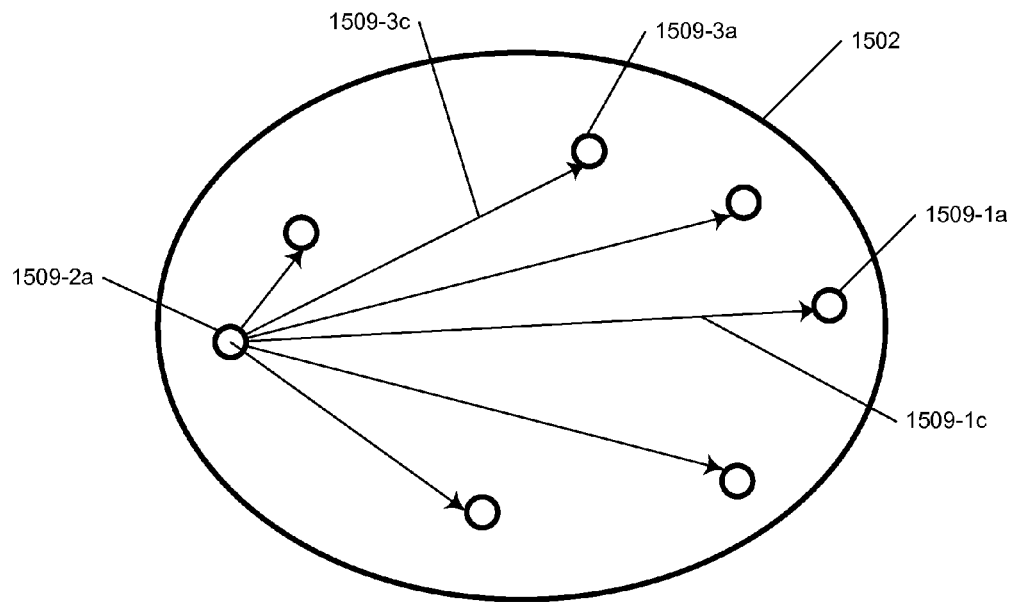
Figure 6F:
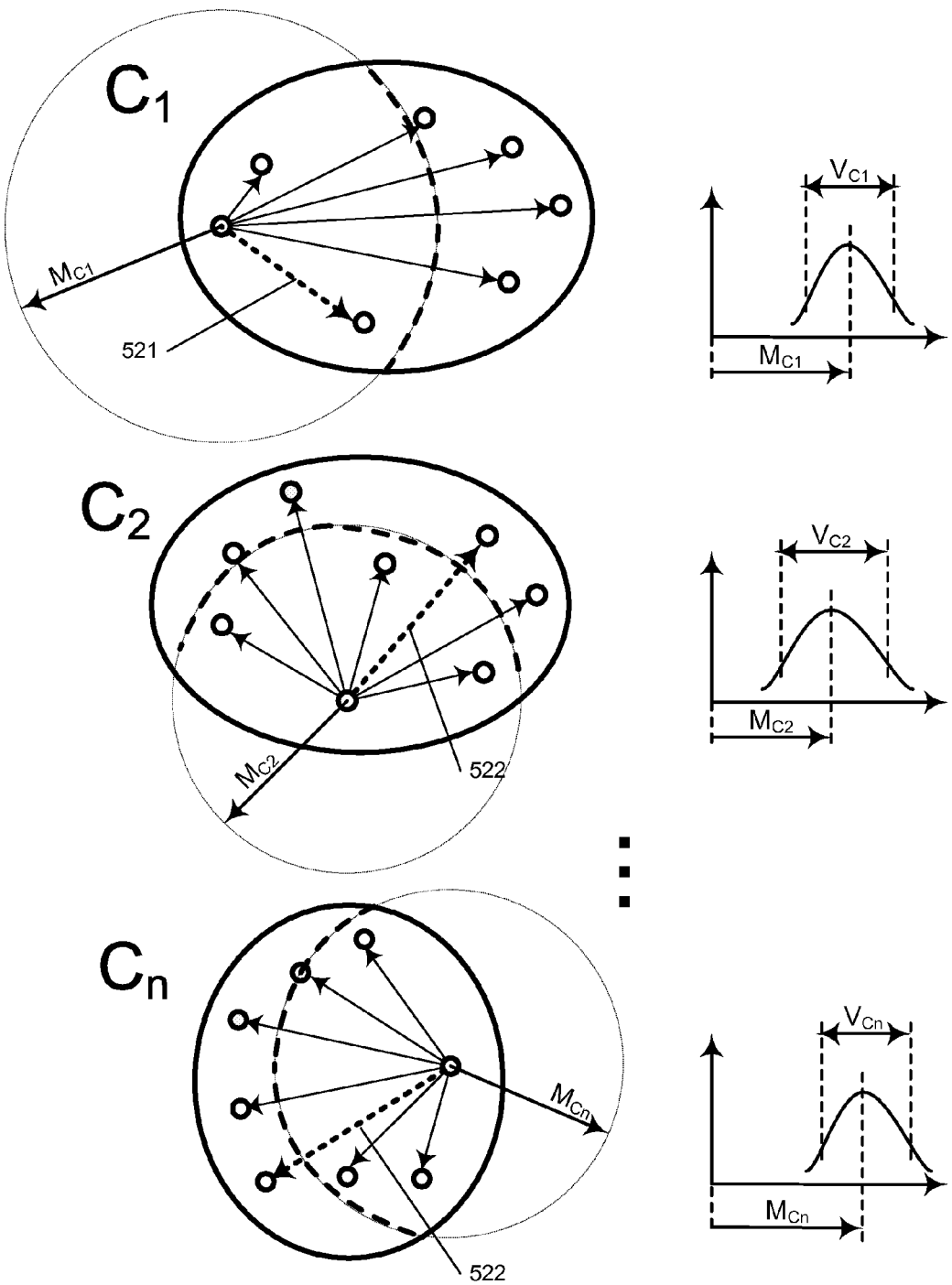
FIG. 6F illustrates how multiple classifiers can be normalized and their similarity measures combined to provide a single, similarity measure.

Another embodiment is described in relation to FIG. 4. This takes the form of a set of software modules 1162 implemented on a desktop computer 1150. A second preferred embodiment provides an implementation within an embedded imaging appliance such as a digital camera.

In this embodiment, a program may be employed in a desktop computer environment and may either be run as a stand-alone program, or alternatively, may be integrated in existing applications or operating system (OS) system components to improve their functionality.

Image Analysis Module

Figure 7:
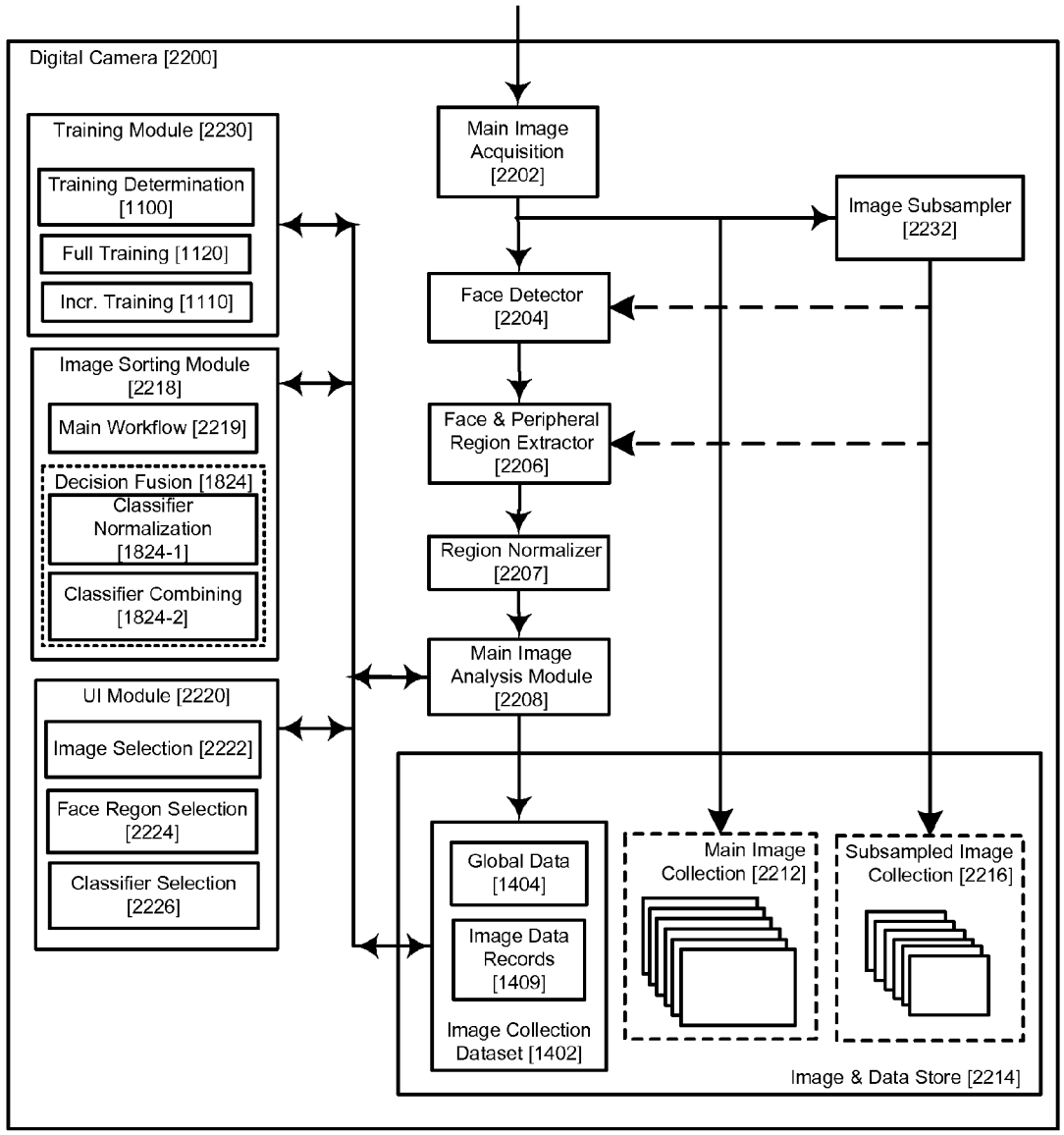
FIG. 7 is a block diagram of an in-camera image processing system according to certain embodiments.

An image analysis module 1156, such as that illustrated at FIG. 4, cycles through a set of images 1170-1 ... 1180-2 and determines, extracts, normalizes and analyzes face regions and associated peripheral regions to determine feature vectors for a plurality of face and non-face classifiers. The module then records this extracted information in an image data set record. Components of this module are also used in both training and sorting/retrieval modes of the embodiment. The module is called from a higher level workflow and in its normal mode of usage is passed a set of images which, as illustrated at FIG. 7, are analyzed [2202]. The module loads/acquires the next image [2202] and detects any face regions in said image [2204]. If no face regions were found, then flags in the image data record for that image are updated to indicate that no face regions were found. If the current image is not the last image in the image set being analyzed [2208], upon image subsampling [2232], face and peripheral region extraction [2206] and region normalization [2207], the next image is loaded/acquired [2204]. If this was the last image, then the module will exit to a calling module. Where at least one face region is detected the module next extracts and normalizes each detected face region and, where possible, any associated peripheral regions.

Face region normalization techniques can range from a simple re-sizing of a face region to more sophisticated 2D rotational and affine transformation techniques and to highly sophisticated 3D face modeling methods.

Image Sorting/Retrieval Process

The workflow for an image sorting/retrieval process or module is illustrated at FIGS. 5 and 6A-6F and is initiated from an image selection or acquisition process (see US 2006/0140455, assigned to same assignee and incorporated by reference) as the final process step [1140]. It is assumed that when the image sorting/retrieval module is activated [1140] it will also be provided with at least two input parameters providing access to (i) the image to be used for determining the search/sort/classification criteria, and (ii) the image collection data set against which the search is to be performed. If a data record is determined to not be available [1306] and has not already been determined for the search image which proceeds to select persons and search criteria in the image [1308], then main image analysis module is next applied to it to generate this data record [1200]. The image is next displayed to a user who may be provided options to make certain selections of face regions to be used for searching and/or also of the classifiers to be used in the search [1308]. Alternatively, the search criteria may be predetermined or otherwise automated through a configuration file and step [1308] may thus be automatic. User interface aspects are described in detail at US 2006/0140455.

After a reference region comprising the face and/or peripheral regions to be used in the retrieval process is selected (or determined automatically) the main retrieval process is initiated [1310] either by user interaction or automatically in the case where search criteria are determined automatically from a configuration file. The main retrieval process is described in step [1312] and comprises three main sub-processes which are iteratively performed for each classifier to be used in the sorting/retrieval process:

(i) Distances are calculated in the current classifier space between the feature vector for the reference region and corresponding feature vector(s) for the face/peripheral regions for all images in the image collection to be searched [1312-1]. In the preferred embodiment, the Euclidean distance is used to calculate these distances which serve as a measure of similarity between the reference region and face/peripheral regions in the image collection.

(ii) The statistical mean and standard deviation of the distribution of these calculated distances is determined and stored temporarily [1312-2].

(iii) The determined distances between the reference region and the face/peripheral regions in the image collection are next normalized [1312-3] using the mean and standard deviation determined in step [1312-2].

These normalized data sets may now be combined in a decision fusion process [1314] which generates a ranked output list of images. These may then be displayed by a UI module [1316].

An additional perspective on the process steps [1312-1, 1312-2 and 1312-3] is given in US 2006/0140455. The classifier space [1500] for a classifier may be such as the Wavelet/PCA face recognition described at US 2006/0140455, incorporated by reference above. The basis vector set, $[\lambda_1, \lambda_2, \ldots, \lambda_n]$ may be used to determine feature vectors for this classifier. The average or mean face is calculated [1501] during the training phase and its vector position [1507] in classifier space [1500] is subtracted from the absolute position of all face regions. Thus, exemplary face regions [1504-1a, 1504-2a and 1504-3a] have their positions [1504-1b, 1504-2b and 1504-3b] in classifier space defined in vector terms relative to the mean face [1501].

After a particular face region [1504-2a] is selected by the user [1308] the distances to all other face regions within a particular image collection are calculated. The face regions [1504-1a] and [1504-3a] are shown as illustrative examples. The associated distances (or non-normalized rankings) are given as [1504-1c] and [1504-3c].

An analogous case arises when the distances in classifier space are measured in absolute terms from the origin, rather than being measured relative to the position of an averaged, or mean face. For example, the color correlogram technique as used in certain embodiments is a classifier of this type which does not have the equivalent of a mean face.

The distances from the feature vector for the reference region [1504-2a] and [1509-2a] to the feature vectors for all other face regions may be calculated in a number of ways. In one embodiment, Euclidean distance is used, but other distance metrics may be advantageously employed for certain classifiers other than those described here.

Methods for Combining Classifier Similarity Measures Statistical Normalization Method A technique is preferably used for normalizing and combining the multiple classifiers to reach a final similarity ranking. The process may involve a set of multiple classifiers, $C_1$, $C_2 \ldots C_N$ and may be based on a statistical determination of the distribution of the distances of all patterns relevant to the current classifier (face or peripheral regions in our embodiment) from the selected reference region. For most classifiers, this statistical analysis typically yields a normal distribution with a mean value $M_{Cn}$ and a variance $V_{Cn}$.

In-Camera Implementation

As imaging appliances continue to increase in computing power, memory and non-volatile storage, it will be evident to those skilled in the art of digital camera design that many advantages can be provided as an in-camera image sorting sub-system. An exemplary embodiment is illustrated in FIG. 7.

Following the main image acquisition process [2202] a copy of the acquired image is saved to the main image collection [2212] which will typically be stored on a removable compact-flash or multimedia data card [2214]. The acquired image may also be passed to an image subsampler [2232] which generates an optimized subsampled copy of the main image and stores it in a subsampled image collection [2216]. These subsampled images may advantageously be employed in the analysis of the acquired image.

The acquired image (or a subsampled copy thereof) is also passed to a face detector module [2204] followed by a face and peripheral region extraction module [2206] and a region normalization module [2207]. The extracted, normalized regions are next passed to the main image analysis module [2208] which generates an image data record [1409] for the current image. The main image analysis module may also be called from the training module [2230] and the image sorting/retrieval module [2218].

A UI module [2220] facilitates the browsing & selection of images [2222], the selection of one or more face regions [2224] to use in the sorting/retrieval process [2218]. In addition classifiers may be selected and combined [2226] from the UI Module [2220].

Various combinations are possible where certain modules are implemented in a digital camera and others are implemented on a desktop computer.

Illumination Classifiers

A branched classifier chain may be used for simultaneous classification of faces and classification of uneven (or even) illumination. In certain embodiments, a classifier chain is constructed that, after an initial set of feature detectors that reject the large majority of objects within an image as non-faces, applies a set of, for example 3, 4, 5, 6, 7, 8 or 9, feature detectors. The feature detectors may tuned so that they accept faces that are illuminated from the top, bottom and left or right illumination (due to faces being left-right symmetrical), OR top, bottom, left or right, and even illumination, OR top, bottom, left, right and even illumination, OR top, left, right, bottom, bottom-right, bottom-left, top-right, and top-left illumination, OR top, left, right, bottom, top right, top left, bottom right, bottom left and even illumination, OR top, bottom, right or left or both, top-right or top-left or both, bottom-right or bottom-left or both, and even. Other combinations are possible, and some may be excluded, e.g., after application of one classifier provides a determination that a face exists within the image or a sub-window of the image of a certain illumination. When one of the classifier branches accepts the face, it can be said that the face and the illumination of the face are detected. This detection can be used to process the image with greater attention to faces than non-faces, and/or to correct the uneven illumination condition, improving face recognition results.

Alternatively, the detected illumination problems in one detection frame may be corrected in the next frame so the face detection algorithm has a better chance of finding the face. The illumination detection comes essentially for free as the length of the classifier chain is not longer than in the previous design.

Figure 8:
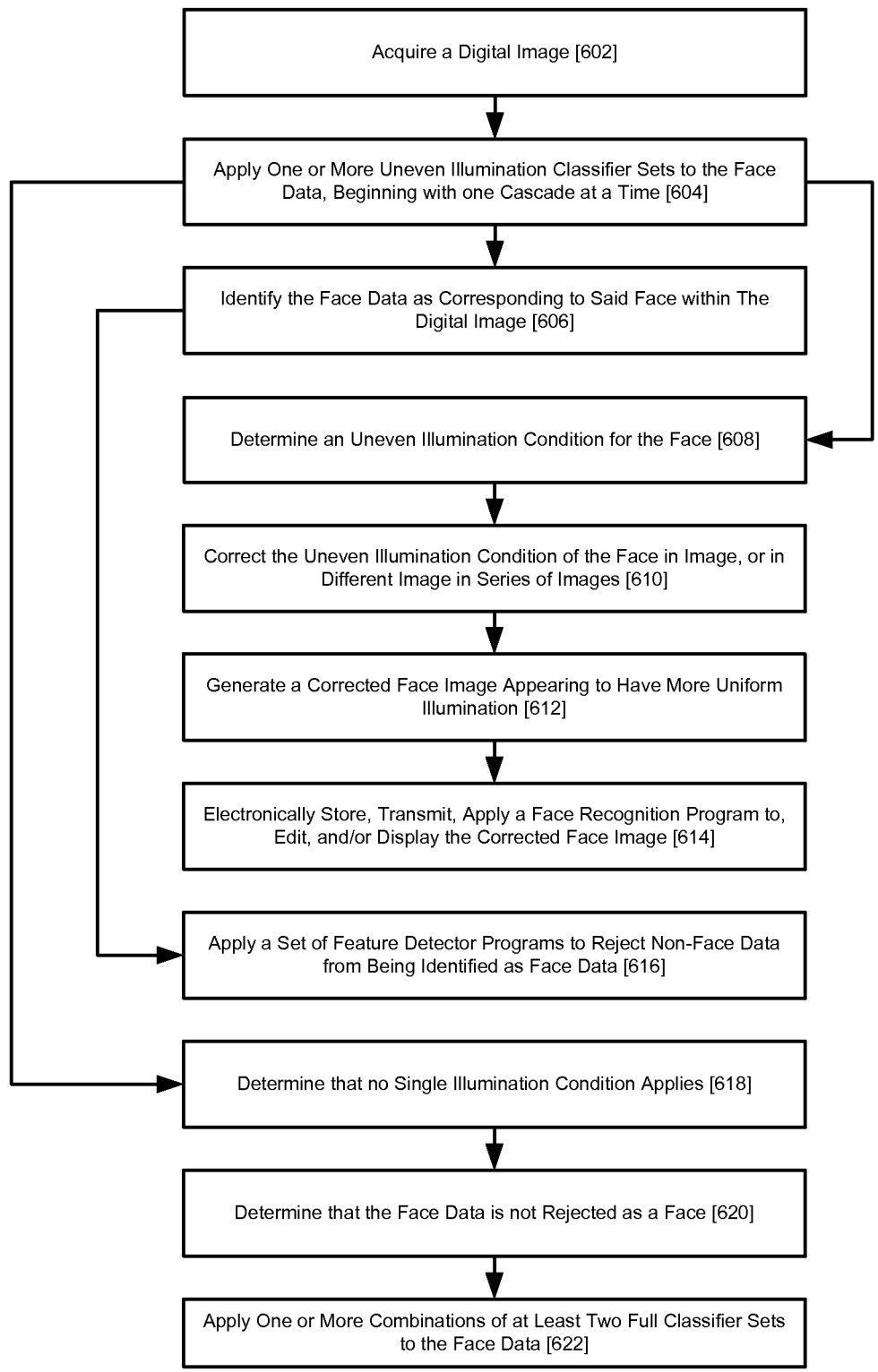
FIG. 8 illustrates a face illumination normalization method in accordance with certain embodiments.

FIG. 8 illustrates a face illumination normalization method in accordance with certain embodiments. A digital image is acquired at 602. One or more uneven illumination classifier sets are applied to the data at 604, beginning with one cascade at a time. The sets may be used to find faces and/or to determine an uneven (or even) illumination condition within already detected face image. Depending on the data retrieved in 604, method according to different embodiments would next identify a face within the image at 606, or determine an uneven (or even) illumination condition for a face at 608, or both 606 and 608 contemporaneously or one after the other in either order. For example, a face may be found and then an illumination condition found for the face, or an illumination condition for an object may be found followed by a determination whether the object is a face.

It may also be determined that no single illumination condition exists at 618. If a face is determined to exist at 606, then at 616, a set of feature detector programs may be applied to reject non-face data from being identified as a face (or accept face data as being identified as a face).

If an uneven illumination condition is determined at 608, then at 610 the uneven illumination condition may be corrected for the image and/or for another image in a series of images. For example, the original image may be a preview image, and a full resolution image may be corrected either during acquisition (e.g., by adjusting a flash condition or by providing suggestions to the camera-user to move before taking the picture, etc.) or after acquisition either in-camera before or after storing a permanent image, or on an external device later-on. Corrected face image data may be generated at 612 appearing to have more uniform illumination, and the corrected face image may be stored, transmitted, applied to a face recognition program, edited and/or displayed at 614.

If it is determined at 618 that no single illumination condition applies, then the face data may be rejected or not rejected as a face at 620. If the face data is not rejected as a face at 620, then at 622, combinations of two or more classifier sets may be applied to the data.

FIGS. 9A-9B illustrate face detection methods in accordance with certain further embodiments. A digital image is acquired at 702. A sub-window is extracted from the image at 704. Two or more shortened face detected classifier cascades are applied to the sub-window at 706. These cascades are trained to be selectively sensitive to a characteristic of a face region.

At 708, a probability is determined that a face with a certain form of the characteristic is present within the sub-window. The characteristic may include an illumination condition, or a pose or direction of the face relative to the camera, or another characteristic such as resolution, size, location, motion, blurriness, facial expression, blink condition, red, gold or white eye condition, occlusion condition or an appearance, e.g., of a face within a collection having multiple appearances such as shaven or unshaven, a hair style, or wearing certain jewelry, among other features. An extended face detection classifier cascade is applied at 710 for sensitivity to the form of the characteristic. A final determination is provided at 712 whether a face exists within the sub-window. If so, then optionally at 714, an uneven illumination condition for the face image may be corrected within the image and/or within a different image in a series of images. In addition, the process may return to 704 to extract a further sub-window, if any, from the image.

At 742, a digital image may be acquired, and a sub-window extracted therefrom at 744. Tow or more shortened face detection classifier cascades may be applied at 746 that are trained to be selectively sensitive to directional face illumination. A probability is determined that a face having a certain directional facial illumination condition is present within the sub-window at 748. An extended face detection classifier cascade is applied at 750 that is trained for sensitivity to the certain form of directional face illumination, e.g., top, bottom, right, left, top-right or top-left, bottom-right or bottom-left, and/or even. A final determination is provided at 752 whether a face exists within the image sub-window. A further sub-window, if any, may then be extracted by returning the process to 744 and/or an uneven illumination condition of the face may be corrected within the image and/or a different image in a series of images at 754.

The "Chain Branching" idea for Luminance is fairly straight-forward to implement and to test since it requires no alterations to the training algorithm. The variations/"mutations" of a face are considered as distinct objects and each one receives a distinct detector/cascade of classifiers. The detectors are all the same, linear chains of full extent.

In detection the straightforward approach would be to exhaustively run all the detectors and see which ones accept the window and then choose the best score. This means that the correct detector is selected at the end. However, this is not what we tested, being very time-consuming.

$$Chain1 = cls11 + cls12 + \ldots + cls1M$$

$$\ldots$$

$$ChainN = clsN1 + clsN2 + \ldots + clsNM$$

The detectors may be run in series or in parallel or some combination thereof, and an at least partial confidence may be accumulated, viz:

$$Partial1 = cls11 + cls12 + \ldots + cls1P$$

$$\ldots$$

$$PartialN = clsN1 + clsN2 + \ldots + clsNP, \text{ with } P < M$$

The best detector is chosen at this point with maximum Partial confidence value. Only that detector continues execution with:

$$ChainMax = PartialMax + clsMax(P+1) + clsMax(P+2) + \ldots + clsMaxM$$

So an exemplary workflow is:
Partial1—
...\
PartialMax—(choose Max)->continue with the rest of Max
.../
PartialN—

This approach may be applied for face pose variation and/or an illumination condition or other characteristic. In the illumination case, one may use any combination of (i) frontally illuminated faces; (ii) faces illuminated from the top; (iii) faces illuminated from bottom; (iv) faces illuminated form the left and (v) faces illuminated from right. Because of the symmetric nature of faces, one could use just one of (iv) and (v) as there is symmetry between the classifiers obtained. The training images used for determining these classifier sets may be generated using an AAM model with one parameter trained to correspond to the level of top/bottom illumination and a second parameter trained to correspond to left/right illumination.

Figure 10A:
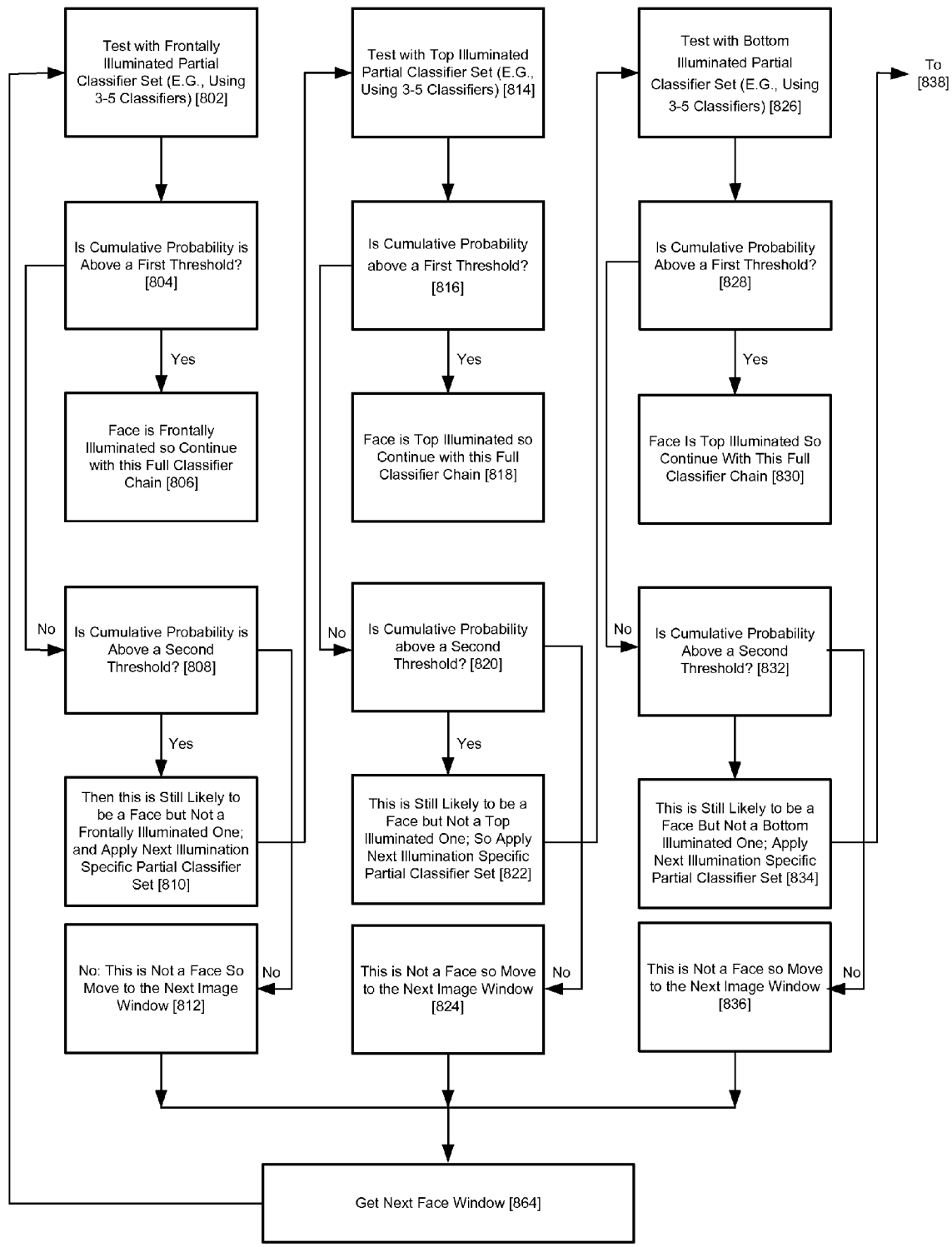
FIGS. 10A-10B illustrate a further method in accordance with certain embodiments.
Figure 10B:
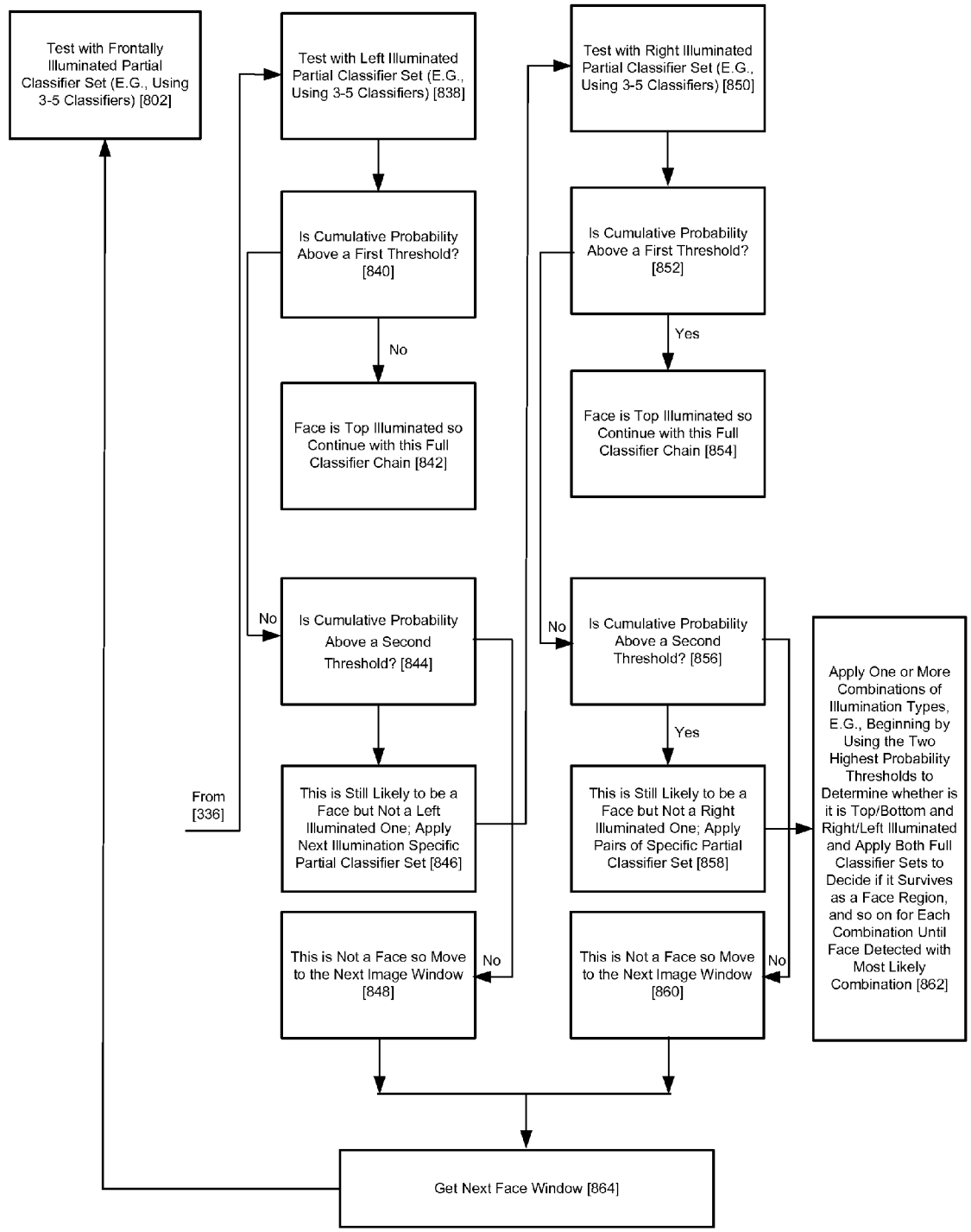

FIGS. 10A-10B illustrate an exemplary detailed workflow. At 802, a sub-window is tested with a frontally illuminated partial classifier set (e.g., using 3-5 classifiers). If a cumulative probability is determined at 804 to be above a first threshold, then the face is determined to be frontally illuminated at 806, and the process is continued with this full classifier chain. If the cumulative probability is determined to be below a second threshold (which is even lower than the first threshold), then at 812 the sub-window is determined to not contain a face, and the process is returned via 864 to 802. If the cumulative probability is determined at 808 to be above a second threshold, yet below the first threshold of 804, then the sub-window is deemed to still likely be a face at 810, but not a frontally illuminated one. Thus, a next illumination specific partial classifier set is applied at 814.

The classifier can be applied in any order, although at step 814, the sub-window is tested with a top illuminated partial classifier set (e.g., using 3-5 classifiers). If the cumulative probability is determined to be above a first threshold at 816, then face is determined to be top illuminated at 818, and the process is continued with this full classifier chain. If the cumulative probability is deemed to be between the first threshold and a lower second threshold at 820, then at 822 the sub-window is determined to still likely contain a face, but not a top illuminated one, and so the process moves to 826 for applying a next illumination specific partial classifier set. If the cumulative probability is deemed to be less than the second threshold, then at 824 the sub-window is determined to not contain a face, and the process moves back through 864 to the next sub-window and 802.

At 826, a test of the sub-window is performed with a bottom illuminated partial classifier set (e.g., using 3-5 classifiers). If the cumulative probability is determined at 828 to be above a first threshold, then the face is determined to be top illuminated and at 830 the process is continued with this full classifier chain. If cumulative probability is below the first threshold, but above a lower second threshold at 832, then the sub-window is determined to still likely contain a face at 834, although not a bottom illuminated one, and so the process moves to 838 and FIG. 10B to apply a next illumination specific partial classifier set. If the cumulative probability is below this second threshold though, then it is determined at 836 than the sub-window does not contain a face, and the process moves through 864 back to 802 and an next sub-window. As the sub-window had not been rejected at 810 nor 822, a further check may be performed prior to rejecting the sub-window at 836, and the same would apply at 824, as well as 846 and 858 of FIG. 10B.

At 838, a test of the sub-window is performed with a left-illuminated partial classifier set (e.g., using 3-5 classifiers). If cumulative probability is deemed to be above a first threshold at 840, then the face is determined to be top illuminated, and at 842, the process is continued with this full classifier chain. Otherwise, if the cumulative probability is still deemed to be above a second threshold below the first at 844, then it is determined at 846 that the sub-window of image data is still likely to contain a face, although not a left illuminated one, and so the next illumination specific partial classifier set is applied at 850. If the cumulative probability is below the second threshold, then at 848, the sub-window is deemed to not contain a face, and so the process is moved to the next image window through 864 back to 802 at FIG. 10A.

At 850, a test of the sub-window is performed with a right-illuminated partial classifier set (e.g., using 3-5 classifiers). If the cumulative probability is deemed to be above a first threshold at 852, then at 854, the sub-window is determined to contain a face that is top illuminated, and the process is continued with this full classifier chain. If at 852, however, the cumulative probability deemed to be below the first threshold, but at 856 it is deemed to be above a second threshold lower than the first, then the sub-window is still deemed to be likely to contain a face at 858, although not a right illuminated one, and so now pairs of specific partial classifier sets are applied at 862. This is because at this point, the window has not passed any of the illumination specific classifiers at their first threshold but neither has it been rejected as a face. Thus, a likely scenario is that the sub-window contains a face that is represented by a combination of illumination types. So, the two highest probability thresholds may be first applied to determine whether is it is top/bottom and/or right/left illuminated, then both full classifier sets are applied to determined if it survives as a face region. If at 856 the cumulative probability is deemed to be below the second threshold, then at 860, the sub-window is deemed not to contain a face and the processes moves through 864 to 802 to the next image sub-window.

The embodiments described herein provide a faster face detection and recognition algorithm and is more accurate than existing models. While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention.

In addition, in methods that may be performed according to preferred embodiments herein and that may have been described above, the operations have been described in selected typographical sequences. However, the sequences have been selected and so ordered for typographical convenience and are not intended to imply any particular order for performing the operations, except for those where a particular order may be expressly set forth or where those of ordinary skill in the art may deem a particular order to be necessary.

In addition, all references cited herein are incorporated by reference, as are the background, invention summary, abstract and brief description of the drawings, and including U.S. patent applications Nos. 60/829,127 and 11/753,397, 60/821,165 and 11/833,224, US2007/0110305, US2006/0140455, US2005/0068452, US2006/0006077, US2006/0120599, US2007/0201724, and paper by Lienhart, Liang and Kuranov, A Detector Tree of Boosted Classifiers for Real-Time Object Detection and Tracking, Proceedings of the 2003 International Conference on Multimedia and Expo—Volume 1, Pages: 277-280 (2003), ISBN: 0-7803-7965-9, Publisher IEEE Computer Society, Washington, D.C., USA. These are incorporated by reference into the detailed description of the preferred embodiments as disclosing alternative embodiments.

What is claimed is:

1. A face illumination normalization method, comprising:
   (a) acquiring a digital image including data corresponding to a face that appears to be illuminated unevenly;
   (b) applying one or more uneven illumination cascaded classifier chains to the face data;
   (c) identifying the face data as corresponding to said face within the digital image;
   (d) determining an uneven illumination condition for the face also as a result of the applying of the one or more uneven illumination cascaded classifier chains;
   (e) correcting the uneven illumination condition of the face based on the determining to thereby generate a corrected face image appearing to have more uniform illumination; and
   (f) electronically storing, transmitting, applying a face recognition program to, editing, or displaying the corrected face image, or combinations thereof,
   wherein the applying comprises applying at least two full classifier sets after determining that no single illumination condition applies and that the face data is not rejected as a face.

2. The method of claim 1, further comprising applying a face recognition program to the corrected face image.

3. The method of claim 1, wherein said cascaded classifier chains comprise branched classifier chains configured such that the identifying of the face data and the determining of the uneven illumination condition of the face are performed simultaneously.

4. The method of claim 1, further comprising applying a set of feature detector programs to reject non-face data from being identified as face data.

5. The method of claim 1, further comprising applying a front illumination cascaded classifier chain to the face data.

6. The method of claim 5, further comprising determining an illumination condition based on acceptance of the face data by one of the cascaded classifier chains.

7. The method of claim 6, wherein the digital image is one of multiple images in a series that include said face, and wherein said correcting is applied to a different image in the series than said digital image within which the illuminating condition is determined.

8. The method of claim 1, wherein said uneven illumination cascaded classifier chain comprise a top illumination cascaded classifier chain, a bottom illumination cascaded classifier chain, and one or both of right and left illumination cascaded classifier chains.

9. The method of claim 8, further comprising applying a front illumination cascaded classifier chain to the face data.

10. A face illumination normalization method, comprising:
    (a) acquiring a digital image including data corresponding to a face that appears to be illuminated unevenly;
    (b) applying one or more uneven illumination classifier programs to the face data;
    (c) identifying the face data as corresponding to said face within the digital image;
    (d) determining an uneven illumination condition for the face also as a result of the applying of the one or more uneven illumination classifier programs;
    (e) correcting the uneven illumination condition of the face based on the determining to thereby generate a corrected face image appearing to have more uniform illumination; and
    (f) electronically storing, transmitting, applying a face recognition program to, editing, or displaying the corrected face image, or combinations thereof, wherein the applying comprises applying at least two full classifier sets after determining that no single illumination condition applies and that the face data is not rejected as a face.

11. A digital image acquisition device including an optoelectronic system for acquiring a digital image, and a digital memory having stored therein processor-readable code for programming the processor to perform a face illumination normalization method, wherein the method comprises:
   (a) acquiring a digital image including data corresponding to a face that appears to be illuminated unevenly;
   (b) applying one or more uneven illumination cascaded classifier chains to the face data;
   (c) identifying the face data as corresponding to said face within the digital image;
   (d) determining an uneven illumination condition for the face also as a result of the applying of the one or more uneven illumination cascaded classifier chains;
   (e) correcting the uneven illumination condition of the face based on the determining to thereby generate a corrected face image appearing to have more uniform illumination; and
   (f) electronically storing, transmitting, applying a face recognition program to, editing, or displaying the corrected face image, or combinations thereof,
   wherein the applying comprises applying at least two full classifier sets after determining that no single illumination condition applies and that the face data is not rejected as a face.

12. The device of claim 11, wherein the method further comprises applying a face recognition program to the corrected face image.

13. The device of claim 11, wherein said cascaded classifier chains comprise branched classifier chains configured such that the identifying of the face data and the determining of the uneven illumination condition of the face are performed simultaneously.

14. The device of claim 11, wherein the method further comprises applying a set of feature detector programs to reject non-face data from being identified as face data.

15. The device of claim 11, wherein the method further comprises applying a front illumination cascaded classifier chain to the face data.

16. The device of claim 15, wherein the method further comprises determining an illumination condition based on acceptance of the face data by one of the cascaded classifier chains.

17. The device of claim 16, wherein the digital image is one of multiple images in a series that include said face, and wherein said correcting is applied to a different image in the series than said digital image within which the illuminating condition is determined.

18. The device of claim 11, wherein said uneven illumination cascaded classifier chain comprise a top illumination cascaded classifier chain, a bottom illumination cascaded classifier chain, and one or both of right and left illumination cascaded classifier chains.

19. The device of claim 18, wherein the method further comprises applying a front illumination cascaded classifier chain to the face data.

20. A digital image acquisition device including an optoelectronic system for acquiring a digital image, and a digital memory having stored therein processor-readable code for programming the processor to perform a face illumination normalization method, wherein the method comprises:
   (a) acquiring a digital image including data corresponding to a face that appears to be illuminated unevenly;
   (b) applying one or more uneven illumination classifier programs to the face data;
   (c) identifying the face data as corresponding to said face within the digital image;
   (d) determining an uneven illumination condition for the face also as a result of the applying of the one or more uneven illumination classifier programs;
   (e) correcting the uneven illumination condition of the face based on the determining to thereby generate a corrected face image appearing to have more uniform illumination; and
   (f) electronically storing, transmitting, applying a face recognition program to, editing, or displaying the corrected face image, or combinations thereof,
   wherein the applying comprises applying at least two full classifier sets after determining that no single illumination condition applies and that the face data is not rejected as a face.

21. A non-transitory computer readable memory having stored therein processor-readable code for programming a processor to perform a face illumination normalization method, wherein the method comprises:
   (a) acquiring a digital image including data corresponding to a face that appears to be illuminated unevenly;
   (b) applying one or more uneven illumination cascaded classifier chains to the face data;
   (c) identifying the face data as corresponding to said face within the digital image;
   (d) determining an uneven illumination condition for the face also as a result of the applying of the one or more uneven illumination cascaded classifier chains;
   (e) correcting the uneven illumination condition of the face based on the determining to thereby generate a corrected face image appearing to have more uniform illumination; and
   (f) electronically storing, transmitting, applying a face recognition program to, editing, or displaying the corrected face image, or combinations thereof,
   wherein the applying comprises applying at least two full classifier sets after determining that no single illumination condition applies and that the face data is not rejected as a face.

22. The digital memory of claim 21, wherein the method further comprises applying a face recognition program to the corrected face image.

23. The digital memory of claim 21, wherein said cascaded classifier chains comprise branched classifier chains configured such that the identifying of the face data and the determining of the uneven illumination condition of the face are performed simultaneously.

24. The digital memory of claim 21, wherein the method further comprises applying a set of feature detector programs to reject non-face data from being identified as face data.

25. The digital memory of claim 21, wherein the method further comprises applying a front illumination cascaded classifier chain to the face data.

26. The digital memory of claim 25, wherein the method further comprises determining an illumination condition based on acceptance of the face data by one of the cascaded classifier chains.

27. The digital memory of claim 26, wherein the digital image is one of multiple images in a series that include said face, and wherein said correcting is applied to a different image in the series than said digital image within which the illuminating condition is determined.

28. The digital memory of claim 21, wherein said uneven illumination cascaded classifier chain comprise a top illumination cascaded classifier chain, a bottom illumination cascaded classifier chain, and one or both of right and left illumination cascaded classifier chains.

29. The digital memory of claim 28, wherein the method further comprises applying a front illumination cascaded classifier chain to the face data.

30. A non-transitory computer readable memory having stored therein processor-readable code for programming a processor to perform a face illumination normalization method, wherein the method comprises:
  (a) acquiring a digital image including data corresponding to a face that appears to be illuminated unevenly;
  (b) applying one or more uneven illumination classifier programs to the face data;
  (c) identifying the face data as corresponding to said face within the digital image;
  (d) determining an uneven illumination condition for the face also as a result of the applying of the one or more uneven illumination classifier programs;
  (e) correcting the uneven illumination condition of the face based on the determining to thereby generate a corrected face image appearing to have more uniform illumination; and
  (f) electronically storing, transmitting, applying a face recognition program to, editing, or displaying the corrected face image, or combinations thereof,
  (g) wherein the applying comprises applying at least two full classifier sets after determining that no single illumination condition applies and that the face data is not rejected as a face.

* * * * *